United States Patent
Nozaki et al.

(10) Patent No.: US 6,236,415 B1
(45) Date of Patent: May 22, 2001

(54) IMAGE FORMING APPARATUS AND CONTROL METHOD THEREFOR

(75) Inventors: Tetsuya Nozaki, Numazu; Shinobu Arimoto, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/216,714

(22) Filed: Dec. 21, 1998

(30) Foreign Application Priority Data

Dec. 24, 1997 (JP) .................................................. 9-355027
Sep. 30, 1998 (JP) ................................................. 10-276329

(51) Int. Cl.[7] ........................... B41J 2/385; G01D 15/06; G03G 15/01
(52) U.S. Cl. ............................................ 347/116; 347/129
(58) Field of Search ..................................... 347/115, 116, 347/129, 133, 235, 250; 399/301; 358/296, 300

(56) References Cited

U.S. PATENT DOCUMENTS

| | | | |
|---|---|---|---|
| 4,942,406 | * 7/1990 | Tsuda | 358/296 X |
| 5,142,304 | * 8/1992 | Sato et al. | 358/296 X |
| 5,331,341 | * 7/1994 | Egawa et al. | 347/115 X |
| 5,424,763 | * 6/1995 | Komiya et al. | 347/116 |
| 5,457,487 | 10/1995 | Sasaki et al. | 347/116 |
| 5,481,365 | 1/1996 | Arimoto | 358/296 |
| 5,673,115 | 9/1997 | Arimoto | 358/296 |
| 5,724,440 | 3/1998 | Funada et al. | 382/162 |
| 5,748,328 | 5/1998 | Usami et al. | 358/298 |

FOREIGN PATENT DOCUMENTS 5-191608  7/1993 (JP) .

* cited by examiner

Primary Examiner—Sandra Brase
(74) Attorney, Agent, or Firm—Fitzpatrick, Cella, Harper & Scinto

(57) ABSTRACT

In forming a multi-colored image by superimposing a plurality of plane images, positional offsets of the plane images are prevented, thereby obtaining high quality color images. The timing at which image data corresponding to each plane image is generated is controlled in accordance with the phase difference between the sub-scanning start signal indicating the rotational timing of an image carrier and the main-scanning start signal representing the rotational timing of a rotating polygonal mirror. Various controls are further performed.

23 Claims, 24 Drawing Sheets

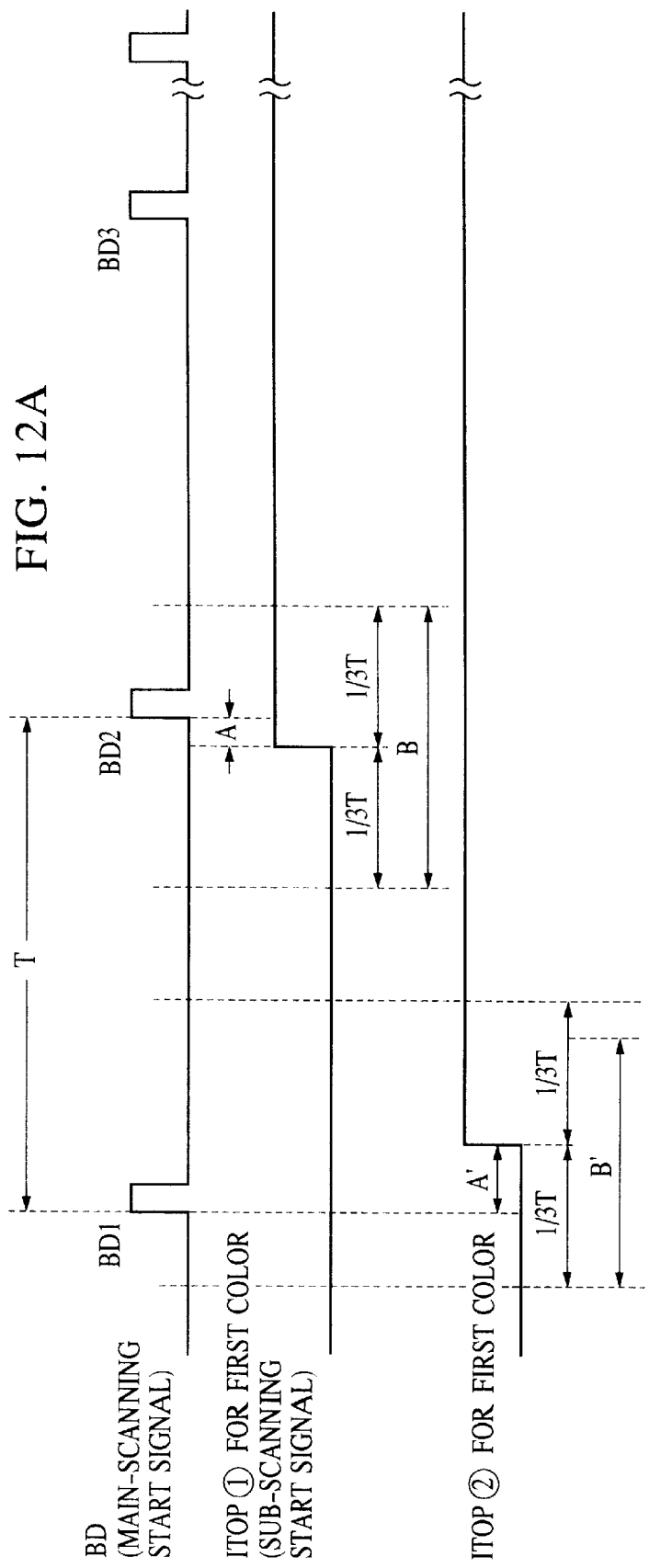

IMAGE FORMING APPARATUS AND CONTROL METHOD THEREFOR

BACKGROUND OF THE INVENTION

1. Field of the Invention

The present invention relates to an image forming apparatus for forming a multi-colored image by superimposing a plurality of plane images. The invention also relates to a control method for the above type of image forming apparatus.

2. Description of the Related Art

As color-image forming apparatuses for printing color image data, laser beam printers (LBPs) are known. In LBPs, scanning is performed on a photosensitive member by reflecting a laser beam on a rotating polygonal member, and latent images, each corresponding to one line of a plane image, are sequentially formed on the photosensitive member. One of the developers (toners), such as magenta (M), cyan (C), yellow (Y), and black (BK), is then attached to the latent images for a plurality of lines (latent images for one frame), thereby forming a plane image for one color. The plane image for one color is transferred to paper fixed on a transfer drum. Then, printing an image for one color is completed. Subsequently, printing operations on the remaining three colors are sequentially performed. Finally, a multi-colored image of four colors is ready to be printed.

Alternatively, another printing method is available. Plane images of the respective four colors formed on a photosensitive member are temporarily superimposed on each other on an intermediate transfer member, and then, the superimposed plane images on the intermediate transfer member are transferred to paper simultaneously.

In the above-described image forming apparatuses, such as LBPs, a plurality of plane images are sequentially superimposed while they are being driven in a sub-scanning direction. More specifically, the photosensitive member, the transfer member, and the intermediate transfer member are driven at a constant velocity in the direction (sub-scanning direction) perpendicular to a main scanning direction. The individual plane images formed on the photosensitive member are transferred to the transfer member or the intermediate transfer member and are superimposed in synchronization with a sub-scanning start signal, which is generated every time the transfer member or the intermediate transfer member is rotated one turn. With this arrangement, positional offsets of the plane images can be reduced.

Alternatively, instead of transferring each plane image for one color to the subsequent stage from the photosensitive member, latent images for four colors may be sequentially formed on the photosensitive member to create the respective plane images for four colors. In this case, the resulting color images formed on the photosensitive member are simultaneously transferred to the subsequent transfer material (paper).

In the aforementioned color-image forming techniques, it is desirable that the individual plane images be superimposed with a minimal amount of positional offset so as to obtain a printed multi-colored image of high quality.

Hitherto, various methods for reducing the amount of the above positional offset have been considered. For example, the number of main-scanning start signals (beam detection (BD) signals) which are obtained while the photosensitive member is rotated one turn is adjusted to be an integer (FIG. 18B). With this arrangement, the operation of a motor for driving the photosensitive member is synchronized with the operation of a scanner motor for driving the main scanning operation.

The aforementioned method is discussed in detail below with reference to FIGS. 18A and 18B. FIG. 18A and 18B schematically illustrate main scanning lines formed on a photosensitive member or an intermediate transfer member of a conventional image forming apparatus.

In FIGS. 18A and 18B, reference numeral 801 indicates an image carrier, such as a photosensitive member or an intermediate transfer member, which will hereinafter be described as a photosensitive member. An ITOP (a signal indicating the top position of a recording sheet) sensor 802 detects a sensor flag (not shown), which is disposed at a predetermined position on a lateral surface of the photosensitive member 801, while the photosensitive member 801 is being rotated one turn, and generates a sub-scanning start signal (ITOP signal).

FIG. 18A illustrates the main scanning lines when the number of main-scanning start signals (BD signals) generated while the photosensitive member 801 is rotated one turn is set to be n+½. That is, FIG. 18A illustrates an example in which the individual plane images fail to be precisely superimposed on one another. In FIG. 18A, there are shown positions of the main-scanning recording line signals, i.e., the first line, the second line, the third line, the (n−1)-th line, the n-th line of the first rotation, and the first line and the second line of the second rotation of the photosensitive member 801. FIG. 18A illustrates the main scanning lines up to the third lines of the second rotation of the photosensitive member 801.

FIG. 18A reveals that every time the photosensitive member 801 is rotated one turn, i.e., every time one sub-scanning start signal is generated, the first line of the first rotation of the photosensitive member 801 is offset with respect to the first line of the second rotation by "0.5" lines. Similarly, for every rotation of the photosensitive member 801, such as the third time, the fourth time, . . . , the (n−1)-th time, and the n-th time, "0.5" lines of offsets are generated between the same order of lines of the (n−1)-th rotation and the n-th rotation.

FIG. 18B illustrates the main scanning lines when the number of main-scanning start signals (BD signals) generated while the photosensitive member 801 is rotated one turn is set to be "n". That is, FIG. 18B illustrates an example in which the individual plane images can be precisely superimposed on each other. FIG. 18B illustrates the main scanning lines up to the third lines of the second rotation of the photosensitive member 801.

FIG. 18B shows that even after the photosensitive member 801 has been rotated a few turns, the same order of lines of the respective rotations, for example, the first line of the first rotation and the second line of the second rotation, theoretically match.

In conventional image forming apparatuses, the following methods are known as methods for providing synchronization between the operation of a motor for driving the photosensitive member or the intermediate transfer member and the operation of the scanner motor for driving the main scanning operation.

In a first method, a signal obtained by scaling a BD signal is used as a reference clock for a motor for driving the photosensitive member or the intermediate transfer member. In the second method, the reference clock for a drum motor for driving the photosensitive member or the intermediate transfer member and the reference clock for a scanner motor for driving the main scanning operation are generated in the same oscillator. Examples of the above-described methods are discussed in detail below.

FIG. 19 illustrates a conventional image forming apparatus constructed in accordance with the aforementioned first method.

In FIG. 19, a photosensitive member 901 is rotated by a photosensitive-member driving motor 907 via a driving belt 908. A scanner motor 902 is controlled to operate at a constant velocity by a phase-locked loop (PLL) circuit 910 based on a reference clock supplied from an oscillator 911, thereby driving a polygonal mirror 903. The polygonal mirror 903 deflects on its mirror planes (for example, eight planes) a laser beam applied from a laser 904 and line-scans the photosensitive member 901 in a planar form via a lens 905.

A beam detect (BD) sensor 906 is disposed on a portion free from an image forming region on the scanning lines of a laser beam, and generates a main-scanning start signal (BD signal) synchronized with the operation of the scanner motor 902, i.e., synchronized with every laser scanning line. For every rotation of the polygonal mirror 903, eight BD signals are generated. A PLL circuit 909 controls the photosensitive-member driving motor 907 to operate at a constant velocity by using the BD signal generated from the BD sensor 906 as a reference clock. With this arrangement, the operation of the scanner motor 902 can be synchronized with the operation of the photosensitive-member driving motor 907.

According to the second method, as noted above, the same clock is used as a reference clock for a motor for driving the photosensitive member or the intermediate transfer member and as a reference clock for a scanner motor for driving the main scanning operation.

FIG. 20 illustrates a known image forming apparatus constructed in accordance with the above-described second method.

In FIG. 20, a photosensitive member 1001 is rotated by a photosensitive-member driving motor (drum motor) 1007 via a driving belt 1008. A scanner motor 1002 is controlled by a PLL circuit 1010 to operate at a constant velocity based on a reference clock supplied from an oscillator 1011, thereby driving a polygonal mirror 1003. The polygonal mirror 1003 deflects on its mirror planes a laser beam applied from a laser 1004 and scans the photosensitive member 1001 in a planar form via a lens 1005.

A PLL circuit 1009 controls the photosensitive-member driving motor 1007 to operate at a constant velocity based on the reference clock generated from the oscillator 1011, which is also used for controlling the scanner motor 1002 via the PLL circuit 1010.

As discussed above, the reference clock for the PLL circuit 1009 for controlling the photosensitive-member driving motor 1007 and the reference clock for the PLL circuit 1010 for controlling the scanner motor 1002 are generated from the same oscillator 1011. Thus, the operation of the scanner motor 1002 can be synchronized with the operation of the photosensitive-member driving motor 1007.

According to the above-described first method or second method, the number of main-scanning start signals (BD signals) obtained while the photosensitive member or the intermediate transfer member is rotated one turn and the number of main-scanning recording lines synchronizing with the BD signals are set to be integers, so that the operation of the motor for driving the photosensitive member can be synchronized with the operation of the scanner motor for driving the main scanning operation. Accordingly, even after the photosensitive member or the intermediate transfer member has been rotated any number of turns, no positional offset occurs to the sub-scanning start position, and a plurality of plane images can be superimposed without being offset with respect to one another on the photosensitive member, the intermediate transfer member, or a transfer material (paper), thereby forming a printed image of high quality.

As another example of a method for controlling the sub-scanning start position, phase matching is provided between the main-scanning start signal and the sub-scanning start signal. This makes it possible to fix the sub-scanning start position without needing to set the number of main-scanning start signals (BD signals) obtained while the photosensitive member or the intermediate transfer member is rotated one turn and the number of corresponding main-scanning recording line signals to be an integer. An example of this method is discussed below as a third method.

FIG. 21 illustrates a conventional image forming apparatus constructed in accordance with the third method.

In FIG. 21, a photosensitive member 1101 is rotated by a photosensitive-member driving motor 1107 via a driving belt 1108. A PLL circuit 1109 controls the photosensitive-member driving motor 1107 to operate at a constant velocity based on the reference clock supplied from an oscillator 1114. An ITOP sensor 1115 generates an ITOP signal by causing a sensor flag 1116 to shield the ITOP sensor 1115 from a beam every time the photosensitive member 1101 is rotated one turn. Based on this ITOP signal, the position at which the recording of the first line on the photosensitive member 1101 is started is determined.

A phase matching circuit 1112 provides synchronization so that the reference clock generated from the oscillator 1113 is in phase with the ITOP signal generated from the ITOP sensor 1115. A PLL circuit 1110 controls a scanner motor 1102 to operate at a low speed based on the reference clock in phase with the ITOP signal.

In this manner, phase matching is performed by the phase matching circuit 1112 on the ITOP signal and the reference clock so as to always adjust the rotational phase of the scanner motor 1102 to each ITOP signal. Accordingly, the rotational phase of the polygonal mirror 1103 driven by the scanner motor 1102 is also synchronized with the ITOP signal. This makes it possible to perfectly align, relative to the ITOP signal, the scanning lines on the photosensitive member 1101 formed by applying a laser beam from the laser 1104 via the lens 1105.

FIG. 22 is a schematic diagram illustrating the relationship between the main scanning lines (main-scanning start signal) formed on the photosensitive member of a known image forming apparatus and the ITOP signal (sub-scanning start signal).

In FIG. 22, reference numeral 1601 represents an image carrier, such as a photosensitive member or an intermediate transfer member, which will hereinafter be described as a photosensitive member. An ITOP sensor 1602 detects a sensor flag (not shown), which is disposed on a predetermined position of a lateral surface of the photosensitive member 1601, and generates a sub-scanning start signal (ITOP signal) every time the photosensitive member 1601 is rotated one turn.

The photosensitive member 1601 is rotated one turn while main scanning is performed for "n+(½)" (n is an integer) lines. The ITOP sensor 1602 generates a sub-scanning start signal at a predetermined position for each rotation of the photosensitive member 1601. With this configuration, since main scanning is performed for "n+(½)" lines for each rotation of the photosensitive member 1601, the first line of the first rotation is offset with respect to the first line of the second rotation by "½" lines, as illustrated in FIG. 18A.

However, by virtue of the phase matching circuit 21, such as the one shown in FIG. 21, every time the ITOP signal (sub-scanning start signal) is generated, the main-scanning start signal (the rotational phase of the scanner motor 1102 synchronizing with the BD signal) is controlled to synchronize with the ITOP signal. Thus, the first lines of the respective rotations of the photosensitive member 1601 can be aligned, as shown in FIG. 22, in response to the respective ITOP signals. It is thus possible to match the individual plane images, free from the occurrence of offset, even if the photosensitive member or the intermediate transfer member is rotated any number of turns.

In addition to the aforementioned techniques for preventing positional offsets of plane images, the following technique is also known, as disclosed in Japanese Patent Laid-Open No. 5-191608: the phase difference between the sub-scanning start signal (ITOP signal) and the main-scanning start signal (BD signal) is detected in advance, and the timing of forming each plane image is suitably adjusted in accordance with the detected amount of offset.

According to the above-described techniques, however, positional offsets of plane images can be eliminated if all the environmental conditions around the image forming apparatuses are ideal. In practice, the above-described techniques cannot perfectly overcome the aforementioned problems.

For example, there are slight variations in the rotational speed of each of the photosensitive member, the intermediate transfer member, and the transfer member due to the influence of load variations or a backlash of a driving transfer gear, etc. Accordingly, the actual phase difference between the main-scanning start signal and the sub-scanning start signal deviates from the ideal phase difference. This causes a further color shift even by the use of the aforementioned technique for aligning the positions of the laser scanning lines on the photosensitive member. Such deviations can be reduced to one-half or even less by suppressing load variations in the motor to a minimal level or by improving the precision of a mechanical driving transfer system.

However, if the phase of a sub-scanning start signal for recording each color is generated after the corresponding main-scanning start signal, a full line of offset disadvantageously occurs, albeit only one half or even less of one line is actually generated.

Practically, as noted above, the above-described deviation incurred while a drum (photosensitive drum, an intermediate transfer drum, or a transfer drum) is rotated one turn, can be reduced to one-half or even less of one line with a minimal amount of load variation of a motor or an enhanced mechanical driving transfer system.

Nevertheless, in superimposing a plurality of plane images, for example, of yellow (Y), magenta (M), cyan (C), and black (BK), the following problem may be presented according to the phase of the ITOP signal corresponding to the recording start signal of the first plane image (Y). If the phase of a sub-scanning start signal for recording the final plane image (BK) is generated after the corresponding main-scanning start signal, a full line of offset occurs even if only one half or even less of one line is actually generated. This situation is described in detail below with reference to FIGS. 23A and 23B.

FIGS. 23A and 23B illustrate the image forming timing in a conventional image forming apparatus and also illustrates the case in which the phase of a sub-scanning start signal for recording each color is generated after the corresponding main-scanning start signal.

The sub-scanning start signal corresponding to the first rotation of the photosensitive member is generated, as shown in FIG. 23A, slightly before the generation of the main-scanning start signal ①. Accordingly, the sub-scanning start signal starts to scan the first line in synchronization with the main-scanning start signal ①, and begins to scan the second line in synchronization with the main-scanning start signal ②, and further commences to scan the third line in synchronization with the main-scanning start signal ③, thus sequentially scanning the respective lines on the photosensitive member. That is, the main-scanning start signals ①, ②, and ③ are regarded as the first, the second, and the third lines, respectively. In this manner, a first plane image is formed on the photosensitive member.

On the other hand, the sub-scanning start signal corresponding to the second rotation is generated slightly later than the main-scanning start signal ①, thus failing to recognize the main-scanning start signal ①. The sub-scanning start signal thus unfavorably starts to scan the first line in synchronization with the main-scanning start signal ②, and begins to scan the second line in synchronization with the main-scanning start signal ②, thus sequentially scanning the respective lines on the photosensitive member. That is, the sub-scanning start signal considers the main-scanning start signal ② as the first line without recognizing the main-scanning start signal ①. Then, the sub-scanning start signal regards the main-scanning start signal ③ as the second line without recognizing the main-scanning start signal ②. In this manner, the second plane image is formed. There is thus generated a maximum of one line of offset between the image-recording start position of the first line and that of the second line (FIG. 23B).

In FIG. 23B, reference numeral 1201 indicates an image carrier, such as a photosensitive member or an intermediate transfer member, which will hereinafter be described as a photosensitive member. An ITOP sensor 1202 causes a sensor flag (not shown) to shield the ITOP sensor 1202 from a beam in accordance with the rotation of the photosensitive member 1201, thereby generating a sub-scanning start signal.

The sub-scanning start signal corresponding to the first rotation is generated slightly before the main-scanning start signal ①, and the sub-scanning start signal corresponding to the second rotation is generated slightly after the main-scanning start line ②. This incurs one line of offset between the first line of the first rotation and the first line of the second rotation.

As discussed above, by causing the sensor flag (not shown) to shield the ITOP sensor 1202 from a beam, the ITOP sensor 1202 generates the sub-scanning start signal in accordance with the rotation of the photosensitive member 1201. The position at which the sub-scanning start signal for the first rotation is generated is slightly before the corresponding main-scanning start signal, while the position at which the sub-scanning start signal for the second rotation Is generated is slightly after the corresponding main-scanning start signal.

FIG. 23B illustrates the pseudo-main-scanning start signals on the photosensitive member 1201. Although the main-scanning start signals ①, ②and ③ for the first rotation and those for the second rotation are completely different, they are shown at the same positions in FIG. 23B. The above-described offsets of the sub-scanning start signals are discussed in detail below with reference to FIG. 24.

FIG. 24 is a timing chart illustrating the image forming timing in a known image forming apparatus and also corresponds to the timing chart shown in FIG. 23A. The same signals as those shown in FIG. 23A are designated with like numbers.

In the conventional image forming apparatus, after a video clock (video CLK) counts "n" times in synchronization with the main-scanning start signal, a memory read signal is generated in the period in which the video CLK is counting "m" times. In synchronization with the memory read signal, the reading of recording data from a memory (not shown) is started, and the data read from the memory is then recorded on the photosensitive member by scanning the respective lines of the member with a laser. The sub-scanning start signal is generated at a predetermined position every time the photosensitive member is rotated one turn. The main-scanning start signal becomes valid to generate a memory read signal after the sub-scanning start signal changes from the "L" level to the "H" level.

In the color-image forming apparatus in which latent images are formed or transferred by superimposing a plurality of colors, the formation or the transferring of latent images are repeated a plurality of times. FIG. 24 illustrates an example in which the color-image forming apparatus forms or transfers latent images twice. In this example, the sub-scanning start signal in relation to the first rotation of the photosensitive member is generated somewhat before the corresponding main-scanning start signal, while the sub-scanning start signal in relation to the second rotation is produced slightly after the corresponding main-scanning start signal.

FIG. 24 reveals that the main-scanning start signal ① becomes valid, since the sub-scanning start signal for the first rotation is generated slightly before the main-scanning start signal ①, so that the memory read signal corresponding to the first line of an image can be synchronized with the main-scanning start signal ①. Accordingly, upon counting the video CLK "n" times after the main-scanning start signal ①, as shown in FIG. 24, the memory read signal corresponding to the first rotation is generated.

In contrast, the sub-scanning start signal corresponding to the second rotation is generated later than that of the first rotation due to rotational fluctuations of the photosensitive member.

Since the sub-scanning start signal in relation to the second rotation is generated slightly after the main-scanning start signal ①, the memory read timing corresponding to the first line of an image is unfavorably synchronized with the main-scanning start signal ② without detecting the main-scanning start signal ①. Accordingly, the memory read signal for the second rotation is generated after the video CLK has counted "n" times in synchronization with the main-scanning start signal ②.

Thus, one line of offset is generated between the memory read signal for the first rotation and that for the second rotation. As a consequence, in recording image data, which is read from the memory in response to the memory read signal, on the respective lines of the photosensitive member, the first line of the first rotation, which should be aligned with the first line of the second rotation, unfavorably matches the second line of the second rotation, thereby causing colors to shift.

According to the foregoing description, in conventional color-matching techniques, the rotational speed of, for example, a photosensitive member, changes due to load variations or a backlash of a driving transfer gear, etc., which further causes variations in the phase difference between the sub-scanning start signal and the main-scanning start signal. As a result, the positions at which the recording of the images of the respective colors is started are offset by one line or more.

SUMMARY OF THE INVENTION

Accordingly, in order to solve the above-described problems, it is an object of the present invention to form a multi-colored image by superimposing a plurality of plane images while positional offsets of the individual plane images are reduced to a minimal level, thereby obtaining a high quality of a printed multi-colored image.

In order to achieve the above object, according to one aspect of the present invention, there is provided an image forming apparatus for forming a multi-colored image by superimposing a plurality of plane images. The image forming apparatus includes image-data generating means for generating image data corresponding to each plane image. Optical-beam generating means generate an optical beam based on image data generated by the image-data generating means. Image-carrier driving means rotate an image carrier. A rotating polygonal mirror scans the image carrier during rotation by reflecting the optical beam on the rotating polygonal mirror during rotation. First generation means generate a sub-scanning start signal to indicate a rotational timing of the image carrier. Second generation means generate a main-scanning start signal to indicate a rotational timing of the rotating polygonal mirror. The image-carrier driving means rotates the image carrier by using the main-scanning start signal generated by the second generation means as a reference clock. The image-data generating means controls a timing at which the image data corresponding to each plane image is generated in accordance with a phase difference between the main-scanning start signal and the sub-scanning start signal.

According to another aspect of the present invention, there is provided an image forming apparatus for forming a multi-colored image by superimposing a plurality of plane images. The image forming apparatus includes image-data generating means for generating image data corresponding to each plane image. Optical-beam generating means generate an optical beam based on image data generated by the image-data generating means. Image-carrier driving means rotate an image carrier. A rotating polygonal mirror scans the image carrier during rotation by reflecting the optical beam on the rotating polygonal mirror during rotation. First generation means generate a sub-scanning start signal to indicate a rotational timing of the image carrier. Second generation means generate a main-scanning start signal to indicate a rotational timing of the rotating polygonal mirror. The image carrier and the rotating polygonal mirror are rotated based on a common reference clock. The image-data generating means controls a timing at which the image data corresponding to each plane image is generated in accordance with a phase difference between the main-scanning start signal and the sub-scanning start signal.

According to still another aspect of the present invention, there is provided an image forming apparatus for forming a multi-colored image by superimposing a plurality of plane images. The image forming apparatus includes optical-beam generating means for generating an optical beam based on image data corresponding to each plane image. Image-carrier driving means rotates an image carrier. A rotating polygonal mirror scans the image carrier during rotation by reflecting the optical beam on the rotating polygonal mirror during rotation. First generation means generates a sub-scanning start signal to indicate a rotational timing of the image carrier corresponding to each plane image. Second generation means generate a main-scanning start signal to indicate a rotational timing of the rotating polygonal mirror. Control means delays the sub-scanning start signal in accordance with a phase difference between the main-scanning start signal and the sub-scanning start signal. The image-carrier driving means rotates the image carrier by using the main-scanning start signal generated by the second generation means as a reference clock.

According to a further aspect of the present invention, there is provided an image forming apparatus for forming a multi-colored image by superimposing a plurality of plane images. The image forming apparatus includes optical-beam generating means for generating an optical beam based on image data corresponding to each plane image. Image-carrier driving means rotate an image carrier. A rotating polygonal mirror scans the image carrier during rotation by reflecting the optical beam on the rotating polygonal mirror during rotation. First generation means generate a sub-scanning start signal to indicate a rotational timing of the image carrier corresponding to each plane image. Second generation means generate a main-scanning start signal to indicate a rotational timing of the rotating polygonal mirror. Control means delays the sub-scanning start signal in accordance with a phase difference between the main-scanning start signal and the sub-scanning start signal. The image carrier and the rotating polygonal mirror are rotated based on a common reference clock.

According to a further aspect of the present invention, there is provided a method for controlling an image forming apparatus for forming a multi-colored image by superimposing a plurality of plane images. The method includes the steps of: generating image data corresponding to each plane image; generating an optical beam based on the image data; rotating an image carrier; scanning the image carrier with the optical beam while the image carrier is rotated, the optical beam being reflected by a rotating polygonal mirror during rotation; generating a sub-scanning start signal to indicate a rotational timing of the image carrier; and generating a main-scanning start signal to indicate a rotational timing of the rotating polygonal mirror. The image carrier is rotated using the main-scanning start signal as a reference clock. A timing at which the image data corresponding to each plane image is generated is controlled in accordance with a phase difference between the main-scanning start signal and the sub-scanning start signal.

According to a further aspect of the present invention, there is provided a method for controlling an image forming apparatus for forming a multi-colored image by superimposing a plurality of plane images. The method includes the steps of: generating image data corresponding to each plane image; generating an optical beam based on the image data; rotating an image carrier; scanning the image carrier with the optical beam while the image carrier is rotated, the optical beam being reflected by a rotating polygonal mirror during rotation; generating a sub-scanning start signal to indicate a rotational timing of the image carrier; and generating a main-scanning start signal to indicate a rotational timing of the rotating polygonal mirror. The image carrier and the rotating polygonal mirror are rotated based on a common reference clock. A timing at which the image data corresponding to each plane image is generated is controlled in accordance with a phase difference between the main-scanning start signal and the sub-scanning start signal.

According to a further aspect of the present invention, there is provided a method for controlling an image forming apparatus for forming a multi-colored image by superimposing a plurality of plane images. The method includes the steps of: generating an optical beam based on image data corresponding to each plane image; rotating an image carrier; scanning the image carrier with the optical beam while the image carrier is rotated, the optical beam being reflected by a rotating polygonal mirror during rotation; generating a sub-scanning start signal to indicate a rotational timing of the image carrier corresponding to each plane image; generating a main-scanning start signal to indicate a rotational timing of the rotating polygonal mirror; and delaying the sub-scanning start signal in accordance with a phase difference between the main-scanning start signal and the sub-scanning start signal. The image carrier is rotated by using the main-scanning start signal as a reference clock.

According to a further aspect of the present invention, there is provided a method for controlling an image forming apparatus for forming a multi-colored image by superimposing a plurality of plane images. The method includes the steps of: generating an optical beam based on image data corresponding to each plane image; rotating an image carrier; scanning the image carrier with the optical beam while the image carrier is rotated, the optical beam being reflected by a rotating polygonal mirror during rotation; generating a sub-scanning start signal to indicate a rotational timing of the image carrier corresponding to each plane image; generating a main-scanning start signal to indicate a rotational timing of the rotating polygonal mirror; and delaying the sub-scanning start signal in accordance with a phase difference between the main-scanning start signal and the sub-scanning start signal. The image carrier and the rotating polygonal mirror are rotated based on a common reference clock.

Further objects, features and advantages of the present invention will become apparent from the following description of the preferred embodiments with reference to the attached drawings.

BRIEF DESCRIPTION OF THE DRAWINGS

FIGS. 12A and 12B are timing charts illustrating the relationship between a main-scanning start signal and a sub-scanning start signal according to a fourth embodiment of the present invention;

FIG. 26 is a schematic diagram illustrating a conventional image forming apparatus;

DESCRIPTION OF THE PREFERRED EMBODIMENTS

[First Embodiment]

Figure 1:
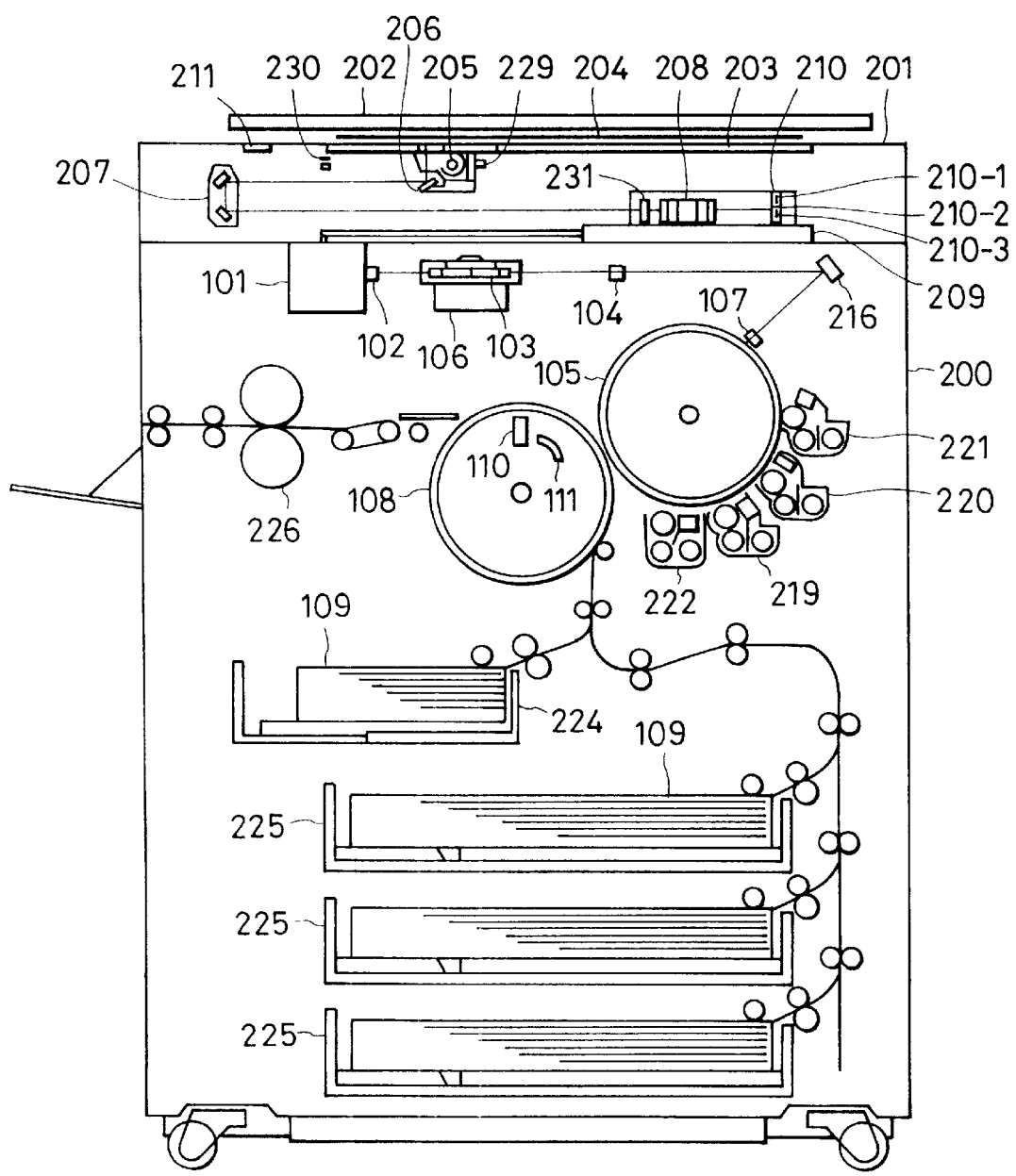
FIG. 1 is a schematic diagram illustrating an image forming apparatus according to a first embodiment of the present invention.

FIG. 1 is a sectional view illustrating the configuration of an image forming apparatus according to a first embodiment of the present invention.

In FIG. 1, an image scanner 201 reads an original document and performs digital signal processing. A printer 200 prints in full color on a recording sheet the original image read by the image scanner 201 or an image representing image data transferred from an external apparatus (not shown), such as a computer, via a predetermined communication medium.

In the image scanner 201, a document pressing plate 202 presses a document 204 on a document table glass 203. A halogen lamp 205 applies light to the document 204 placed on the document table glass 203.

A three-line sensor (hereinafter referred to as the "CCD") 210 is formed of a red (R) sensor 210-1, a green (G) sensor 210-2, and a blue (B) sensor 210-3. The light reflected by the document 204 passes through mirrors 206 and 207, and a lens 208 provided with a far-infrared cut filter 231 so as to form an image on the CCD 210. The CCD 210 then performs color separation on the light information obtained by the image formed on the CCD 210 so as to read full-color information, such as R, G and B components. A signal processor 209 electrically processes R, G and B signals read by the R, G and B sensors 210-1 through 210-3 so as to convert the processed R, G and B signals into magenta (M), cyan (C), yellow (Y), and black (BK) components. The M, C, Y and BK components are then supplied to the printer 200.

A standard white plate 211 is read by the R, G and B sensors 210-1 through 210-3 so as to generate corrected data. The standard white plate 211 exhibits substantially uniform reflection characteristics in relation to a range from visible light to infrared light, presenting a white color in visible light. By using the standard white plate 211, the output data of the visible-light sensor of the R, G and B sensors 210-1 through 210-3 is corrected. An optical sensor 230 generates an image top signal (VTOP) in cooperation with a flag plate 229.

In the printer 200, an image-write-timing control circuit 101 modulates a semiconductor laser 102 based on the image signals of M, C, Y and BK input from the image scanner 201 or input from an external apparatus (not shown), such as a computer, via a predetermined communication medium. A polygonal mirror 103, which is rotated by a polygonal-mirror motor 106, reflects laser light applied from the semiconductor laser 102 and scans on a photosensitive drum 105 with the laser light via a f-θ lens 104 and a reflecting mirror 216.

The photosensitive drum 105 forms electrostatic latent images by being laser-scanned with the polygonal mirror 103. A BD sensor 107 is provided in the vicinity of the position at which laser scanning of the first line is started. The BD sensor 107 detects the laser scanning and generates a main-scanning start reference signal for the respective lines in the same period, i.e., the BD signal.

A magenta (M) developer unit 219, a cyan (C) developer unit 220, a yellow (Y) developer unit 221, and a black (BK) developer unit 222 respectively develop the electrostatic latent images formed on the photosensitive drum 205, thereby forming toner images. A transfer drum 108 attracts a recording sheet 109 supplied from a paper cassette 224 or 225 and transfers the toner images formed on the photosensitive drum 105 on the recording sheet 109.

An ITOP sensor 110 detects the passing of a sensor flag 111 fixed within the transfer drum 108 by the rotation of the transfer drum 108, thereby generating a sub-scanning start signal of each color (a signal indicating the top position of the recording sheet 109 which is intimately fixed on the transfer drum 108, i.e., ITOP signal). A fixing unit 226 fixes the toner images transferred on the recording sheet 109 from the transfer drum 108.

The operations of the above-described individual elements are as follows.

Light is applied to the document 204 placed on the document table glass 203 from the halogen lamp 205, and the light reflected by the document 204 travels through the mirrors 206 and 207 and forms an image on the CCD 210 through the lens 208. The CCD 210 then performs color separation on the light information obtained by the image formed on the CCD 210 so as to read full-color information, such as R, G and B components. The R, G and B components are then supplied to the signal processor 209. The halogen lamp 205 and the mirror 206 are mechanically moved at a velocity "v" and the mirror 207 is moved at a velocity "v/2" in a direction (sub-scanning direction) perpendicular to the electrical scanning direction (main scanning direction) of the CCD 210, thereby scanning the entire surface of the document 204.

The output data of the visible sensor of the R, G and B sensors 210-1 through 210-3 is corrected by using the standard white plate 211. The optical sensor 230 generates the image top signal VTOP in cooperation with the flag plate 229. The signal processor 209 electrically processes the read R, G and B signals to convert them into M, C, Y and BK components and outputs them to the printer 200.

Every time the scanning operation is performed on the document 204 by the image scanner 210, one of the M, C, Y and BK components is output to the printer 200. That is, the document 204 is scanned four times to print the whole full-color image.

Meanwhile, the image signal output from the image scanner 201 or output from an external apparatus (not shown), such as a computer, via a predetermined communication medium is transmitted to the image-write-timing control circuit 101. The image-write-timing control circuit 101 modulates the semiconductor laser 102 in accordance with the M, C, Y and BK image signals. The laser light applied from the semiconductor laser 102 is reflected on the rotating polygonal mirror 103, and the scanning angle fθ of the laser light is corrected by the f-θ lens 104. The laser light is further reflected by the reflecting mirror 216 and scans on the photosensitive drum 105, thereby forming electrostatic latent images on the photosensitive drum 105.

Subsequently, while the photosensitive drum 105 is rotated four times, the four developer units 219 through 222 are alternately brought into contact with the photosensitive drum 105 so as to respectively develop the M, C, Y and BK latent images formed on the photosensitive drum 105 with the corresponding toners. The recording sheet 109 fed from the paper cassette 224 or 225 is wound around the transfer drum 108, and the toner images of the four colors M, C, Y and BK developed by the developer units 219 through 222 are sequentially transferred to the recording sheet 109. The recording sheet 109 further passes through the fixing unit 226 and is then discharged.

Figure 2:
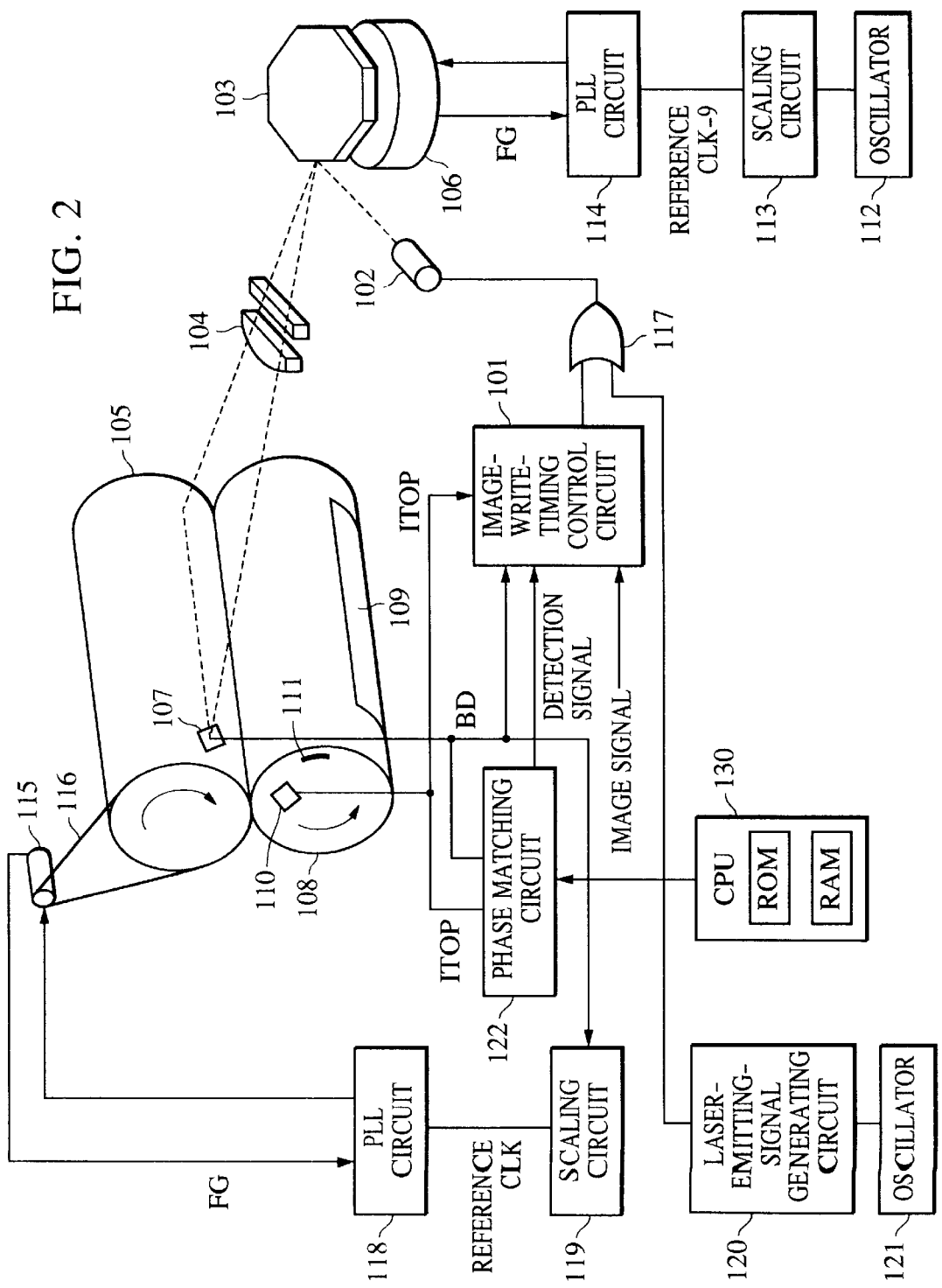
FIG. 2 is a schematic diagram illustrating the configuration of a printer for use in the image forming apparatus shown in FIG. 1.

FIG. 2 illustrates the detailed configuration of the printer 200 for use in the image forming apparatus shown in FIG. 1. The same elements as those shown in FIG. 1 are designated with like reference numerals.

In FIG. 2, an oscillator 112 outputs a clock of a predetermined frequency. A scaling circuit 113 scales the clock output from the oscillator 112 with a predetermined scaling ratio so as to generate a polygonal-mirror motor driving pulse (reference CLK-P). In order to provide the phase matching between the reference CLK-P and a motor FG pulse output in accordance with the operation of the polygonal-mirror motor 106, a PLL circuit 114 detects and compares the phase difference and the frequency deviation between the FG pulse and the reference CLK-P, and then performs PLL control on the driving voltage to be supplied to the polygonal motor 106.

An oscillator 121 outputs a clock of a predetermined frequency. A laser-emitting-signal generating circuit 120 receives the clock from the oscillator 121 and a BD signal from the BD sensor 107, thereby outputting a laser emitting signal for detecting the BD signal. A phase matching circuit 122 receives an ITOP signal from the ITOP sensor 110, the BD signal from the BD sensor 107, and a data load enable signal from a central processing unit (CPU) 130. Based on the phase difference between the ITOP signal and the BD signal, the phase matching circuit 122 delays the ITOP signal (performs phase matching).

The image-write-timing control circuit 101 receives the ITOP signal output from the phase matching circuit 122 and outputs an image signal in synchronization with the ITOP signal. An OR gate 117 outputs the image signal from the image-write-timing control circuit 101 or the laser emitting signal for detecting the BD signal from the laser-emitting-signal generating circuit 120 to the semiconductor laser 102, thereby modulating the semiconductor laser 102.

A scaling circuit 119 scales the BD signal from the BD sensor 107 with a predetermined scaling ratio so as to generate a photosensitive-drum-motor driving pulse (reference CLK). In order to provide phase matching between the reference CLK and a motor FG pulse output in accordance with the operation of a photosensitive-drum motor 115, a PLL circuit 118 detects and compares the phase difference and the frequency deviation between the FG pulse and the reference CLK, and then performs PLL control on the driving voltage to be supplied to the photosensitive-drum motor 115. The CPU 130, which integrates a read only memory (ROM) and a random access memory (RAM), controls the entire image forming apparatus based on the program stored in the ROM.

The operations of the above-described individual elements are as follows.

Image signals transferred from the image scanner 201 shown in FIG. 1 or from an external apparatus (not shown), such as a computer, via a communication medium, are supplied to the image-write-timing control circuit 101. The image-write-timing control circuit 101 modulates the semiconductor laser 102 in response to the image signals of M, C, Y and BK via the OR gate 117. The laser light from the semiconductor laser 102 is reflected by the rotating polygonal mirror 103, and the scanning angle fθ is corrected by the f-θ lens 104. The laser light is further reflected by the reflecting mirror 216 shown in FIG. 1 and scans on the photosensitive drum 105, thereby forming electrostatic latent images on the photosensitive drum 105.

The polygonal-mirror motor driving pulse (reference CLK-P), which is obtained by scaling the clock of the oscillator 112 in the scaling circuit 113, is supplied to the PLL circuit 114. To provide the phase matching between the motor FG pulse from the polygonal-mirror motor 106 and the reference CLK-P, the PLL circuit 114 detects and compares the phase difference and the frequency deviation between the FG pulse and the reference CLK-P, and then performs PLL control on the driving voltage to be supplied to the polygonal-mirror motor 106.

The BD sensor 107, which is provided in the vicinity of the position at which laser scanning of the first line is started, detects the laser line-scanning and generates the scanning start reference signal (BD signal) for the respective lines of the same cycle, which will be described in detail later with reference to FIG. 3. Meanwhile, the ITOP sensor 110 detects the sensor flag 111 fixed within the transfer drum 108 in accordance with the rotation of the transfer drum 108, and then generates the ITOP signal of the respective colors (which represents the top position of the recording sheet 109 on the transfer drum 108). The ITOP signal is described in detail later with reference to FIG. 3. The motor driving pulse (reference CLK) obtained by scaling the laser emitting signal from the laser-emitting-signal generating circuit 120 in the scaling circuit 119 is supplied to the PLL circuit 118, thereby operating the photosensitive-drum motor 115.

For providing phase matching between the reference CLK and the motor FG pulse from the photosensitive-drum motor 115, the PLL circuit 118 detects and compares the phase difference and the frequency deviation between the FG pulse and the reference CLK, and then performs PLL control on the driving voltage to be supplied to the photosensitive-drum motor 115. The photosensitive drum 105 is rotated by the photosensitive-drum motor 115 via a gear belt 116 in the direction indicated by the arrow shown in FIG. 2, and the transfer drum 108 is rotated in the direction indicated by the arrow shown in FIG. 2 (sub-scanning direction) via the photosensitive drum 105 and a gear (not shown) at the same speed in synchronization with the photosensitive drum 105. The BD signal and the ITOP signal are input into the image-write-timing control circuit 101, and the image signals are transmitted to the semiconductor laser 102, for example, at the following timing. Upon detecting the rising pulse of the ITOP signal, the image-write-timing control circuit 101 counts the BD signal a predetermined number of times, and then generates the sub-scanning start signal (equivalent to "m" number of pulses of the BD signal determined by the length of the recording sheet 109) in synchronization with the "n"-th pulse of the BD signal, thereby applying the image signal to the photosensitive drum 105 as the modulated laser light.

Figure 3:
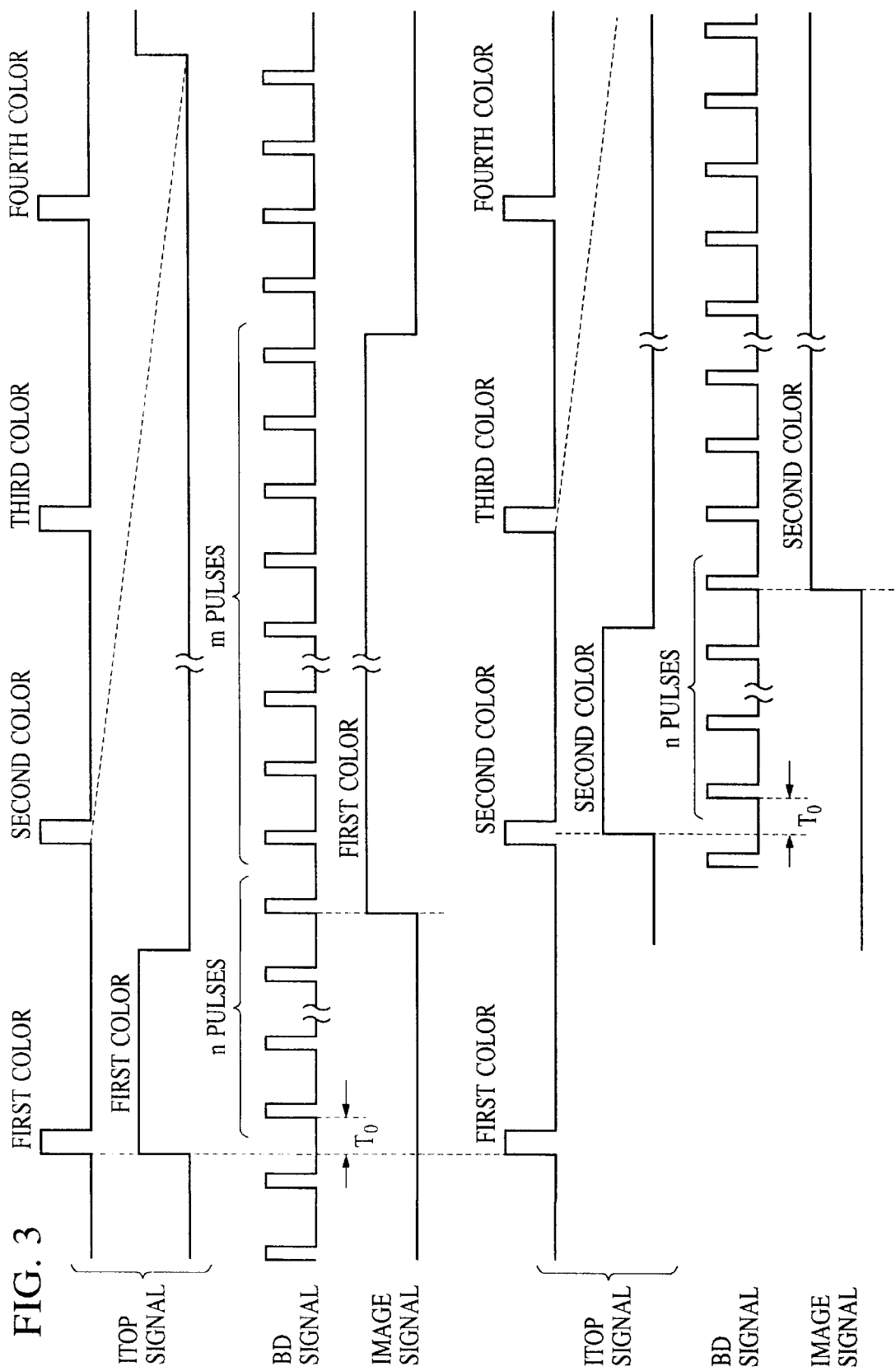
FIG. 3 is a timing chart of image formation by the printer shown in FIG. 2.

FIG. 3 is a timing chart illustrating the timing of image formation by the printer 200 of the image forming apparatus shown in FIG. 1.

In FIG. 3, the ITOP signal represents the top position of the recording sheet 109 on the transfer drum 108, which is output upon detecting the sensor flag 111 fixed within the transfer drum 108 by the ITOP sensor 110 in accordance with the rotation of the transfer drum 108. The ITOP signal is output for each color.

The BD signal is output upon detecting laser line-scanning by the BD sensor 107, which is provided in the vicinity of the position at which laser scanning of the first line is started. The BD signal indicates the scanning start reference signal for the respective lines of the same cycle.

As discussed above, the BD signal and the ITOP signal are input into the image-write-timing control circuit 101. In synchronization with the rising of the "n"-th pulse of the BD signal after detecting the rising of the ITOP signal, the image signal is transmitted to the semiconductor laser 102 via the OR gate 117. That is, in synchronization with the rising of the "n"-th (n is a predetermined number) pulse of the BD signal upon detecting the rising of the ITOP signal, the sub-scanning start signal equivalent to "m" number of pulses of the BD signal is generated to apply the image signal to the photosensitive drum 105 as the modulated laser light.

In this embodiment, the image forming apparatus is configured in such a manner that n number of BD signals (n is an integer) are output while the photosensitive drum 105 is rotated one turn. With this arrangement, scanning light is always applied to the same position of the photosensitive drum 105 for every rotation. The number of BD signals output while the photosensitive drum 105 is rotated one turn, which is determined by the process speed and the resolution, is "8192".

At the gear ratio of "64" operations of the photosensitive-drum motor 115 to one rotation of the photosensitive drum 105, "32" FG pulses are output in relation to one operation of the photosensitive-drum motor 115. That is, "32" pulses of the reference clock are required for operating the photosensitive-drum motor 115 one turn.

Accordingly, in order to rotate the photosensitive drum 105 one turn, 2048 pulses (64 rotations by 32 pulses) of the reference clock are needed. By scaling the BD signal by one fourth and using the scaled signal as the reference CLK for the photosensitive-drum motor 115, the photosensitive drum 105 is rotated one turn when 8192 BD signals are output.

The numbers of operations of the photosensitive-drum motor 115 and rotations of the photosensitive drum 105 in the above gear ratio are adapted to be natural numbers. That is, the motor 115 and a reduction gear are operated n number of times (n is an integer) while the photosensitive drum 105 is rotated one turn. With this arrangement, even if the motor 115 and the reduction gear are offset every time the photosensitive drum 105 is rotated, there is no variation in the amount of offset with respect to the respective rotations. As a result, color shifting caused by the above offset is completely eliminated.

An example of the phase matching method is discussed below.

Figure 4:
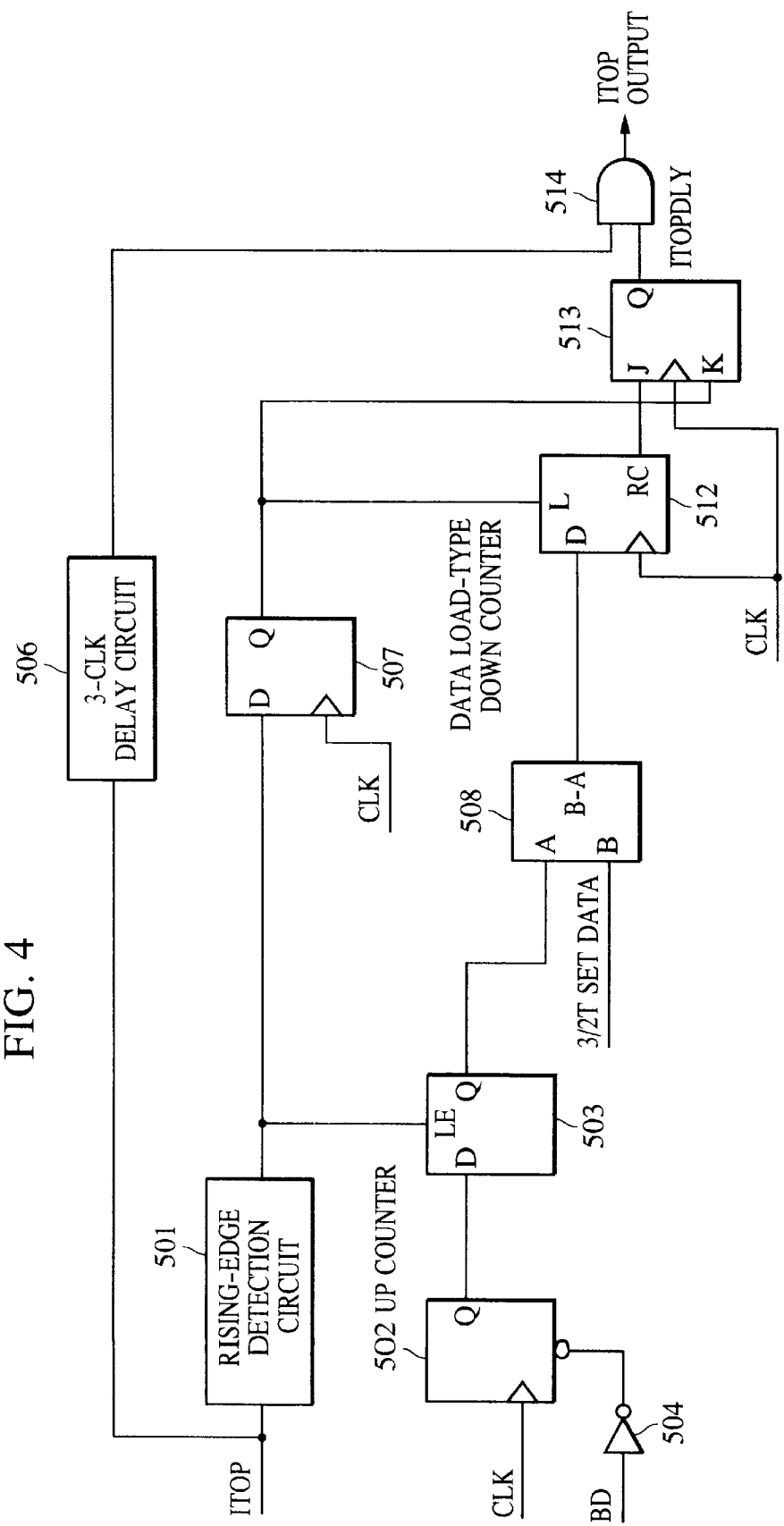
FIG. 4 is a circuit diagram illustrating the configuration of a phase matching circuit for use in the image forming apparatus according to the first embodiment of the present invention.

FIG. 4 is a circuit diagram illustrating the configuration of the phase matching circuit 122 shown in FIG. 2.

In FIG. 4, a rising-edge detection circuit 501 detects the rising edge of the ITOP signal generated by the ITOP sensor 110 disposed within the transfer drum 108. An UP counter 502 is a free-run counter that is reset to be "0" upon inputting the BD signal and repeatedly counts up. The number of counts by the UP counter 502 serves as the cycle of the BD signal.

A 3-CLK delay circuit 506 delays the ITOP signal by a predetermined period (3 CLKs in this embodiment) and outputs the delayed ITOP signal to an AND gate 514. A flip-flop 507 matches the timing of the output of the rising-edge detection circuit 501 to the clock (CLK).

A latch circuit 503 latches the output of the UP counter 502 at the output timing of the rising-edge detection circuit 501. Accordingly, the latched count data indicates the position of the rising edge of the ITOP signal in the cycle of the BD signal, i.e., the data representing the phase difference between the ITOP signal and the BD signal. The output terminal of the rising-edge detection circuit 501 is connected to a latch enable terminal LE of the latch circuit 503, thereby making it possible to latch the output of the UP counter 502 in synchronization with the detection of the rising edge of the ITOP signal.

A subtracting circuit 508 subtracts the count data latched by the latch circuit 503 from the data set by the CPU 130. In this embodiment, when the number of counts of the cycle of the BD signal (which is a known value uniquely determined by the image forming apparatus) is T, the set data is determined to be "(3/2)T", which is 1.5 times T. The resulting output from the subtracting circuit 508 is used as a period by which the ITOP signal is to be delayed, i.e., the duration from the input of the ITOP signal to the middle of the subsequent cycle of the BD signal. More specifically, if the number of counts T of the cycle of the BD signal is set to be "100", and if the ITOP signal is input at a position of the counts "80" (=latched data) of the UP counter 502, it is determined that the ITOP signal is delayed by "70" counts ((3/2)T−80=150−80). In this manner, the input timing of the ITOP signal is adjusted to the middle of the subsequent cycle of the BD signal.

A data load-type down counter (hereinafter referred to as the "down counter") 512 loads the output data of the subtracting circuit 508 through a data load terminal in synchronization with the data of the rising-edge detection circuit 501 which has matched the timing of the clock by using the flip-flop 507.

Upon completing the counts of the loaded data, the down counter 512 outputs an RC output to a JK flip-flop 513. The counting period of the down counter 512 is used as a delay period for phase matching of the ITOP signal. The JK flip-flop 513 is reset at the rising edge of the ITOP signal, and the Q output of the JK flip-flop 513, i.e., ITOPDLY, is set at the level "L". The Q output remains at the level "L" until the RC output of the down counter 512 has been output and set.

That is, the Q output remains at the level "L" for a period necessary for delaying the ITOP signal after the rising edge of the ITOP signal. The ITOPDLY output and the delayed ITOP signal for a predetermined period (3 CLKs in this embodiment) are output via an AND gate 514. As a consequence, the ITOP signal can be generated at the middle of the cycle of the BD signal.

By inputting the above-described data-load enable signal, the phase of the BD signal and the phase of the ITOP signal only corresponding to the first rotation are sampled, and the ITOP signal is delayed to match the middle of the cycle of the BD signal. Then, for the second rotation through the n-th rotation, the data-load enable signal is set at the level "L". This makes it possible to retain the same data used for the delay operation for the first rotation. Accordingly, the ITOP signal for the first rotation is generated at the middle of the cycle of the BD signal, and the ITOP signals for the second rotation and thereafter are generated while being offset from the middle of the cycle of the BD signal in accordance with the mechanical precision of the image forming apparatus, such as the operational precision of the photosensitive-drum motor 115.

The operations of the individual elements of the phase matching circuit 122 shown in FIG. 4 are described below with reference to FIGS. 5 and 6.

Figure 5:
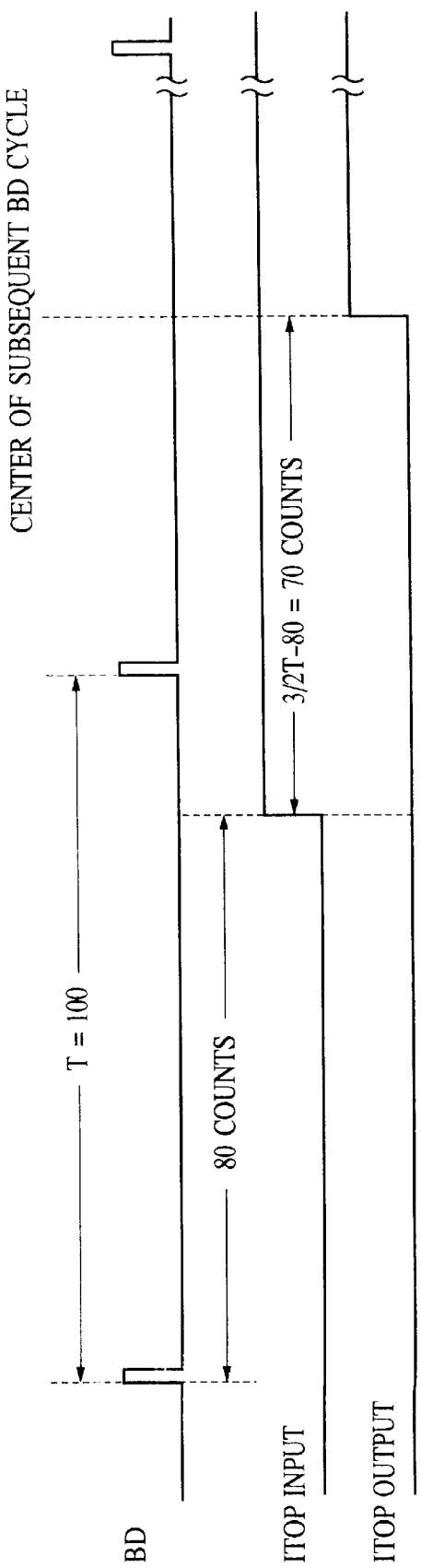
FIG. 5 is a timing chart illustrating a method for calculating the delay period of an ITOP signal by a subtracting circuit.
Figure 6:
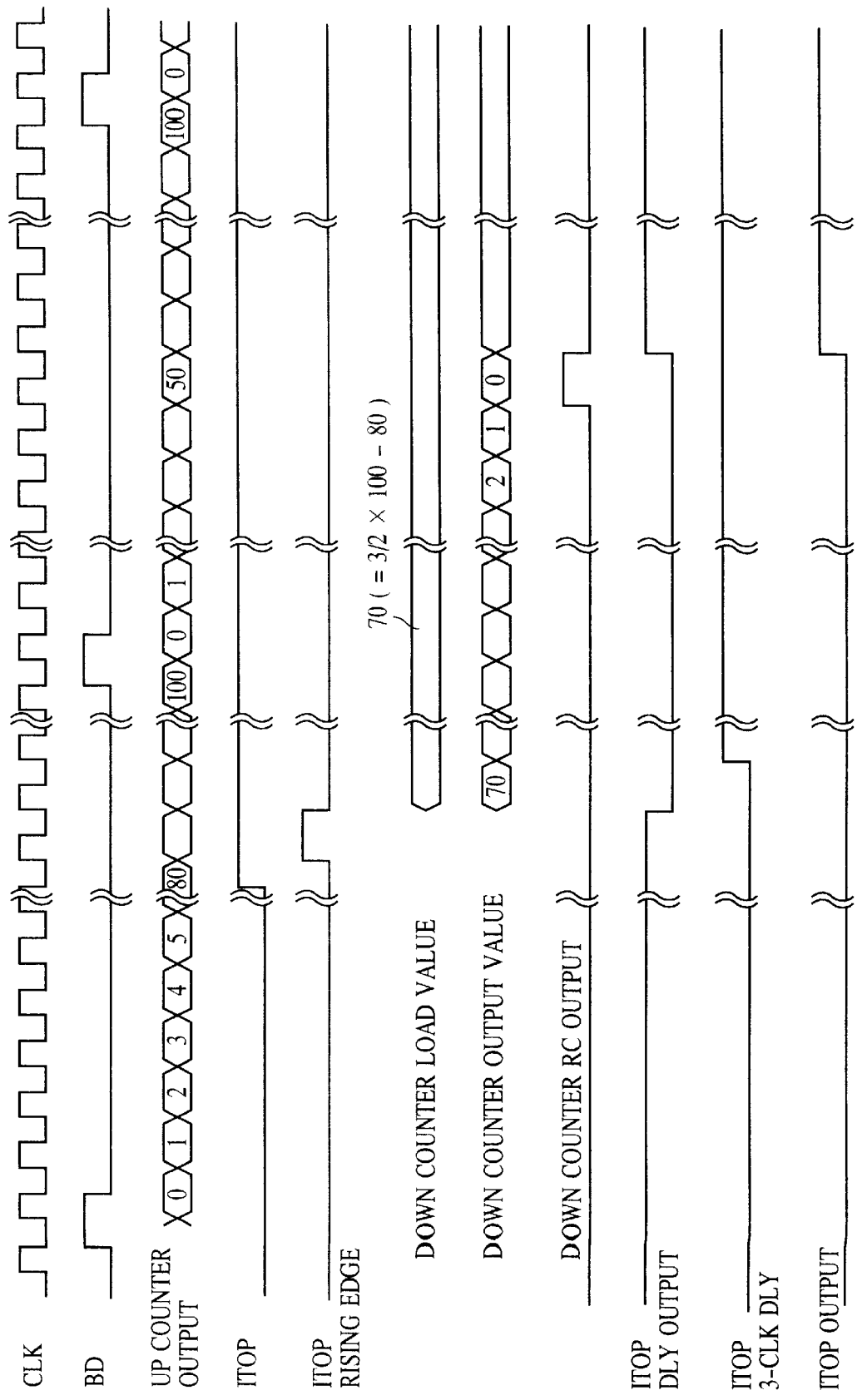
FIG. 6 is a timing chart illustrating a phase matching method between a BD signal and an ITOP signal.

FIG. 5 is a timing chart illustrating an example of the calculating method for the delay period of the ITOP signal by the subtracting circuit 508 shown in FIG. 4. FIG. 6 is a timing chart illustrating an example of the method for providing phase matching between the BD signal and the ITOP signal by the phase matching circuit 122 shown in FIG. 4.

Upon generating the BD signal, the UP counter 502 is reset to "0" and starts counting up (the number of counts serves as the cycle of the BD signal). Subsequently, upon detecting the rising edge of the ITOP signal generated from the ITOP sensor 110 by the rising-edge detection circuit 501, the latch circuit 503 latches the output of the UP counter 502 at the output timing of the rising-edge detection circuit 501. The count data latched by the latch circuit 503 indicates the position of the rising edge of the ITOP signal during the cycle of the BD signal. That is, the count data represents the phase difference between the ITOP signal and the BD signal, which is then input into the subtracting circuit 508.

In the subtracting circuit 508, the count data A latched by the latch circuit 503 is subtracted from the data B set by the CPU 130 (B−A). For example, if the number of counts within the cycle of the BD signal (a known value uniquely determined by the image forming apparatus) is "100", and if the count data latched by the latch circuit 503 is "80", the resulting value output from the subtracting circuit 508 is "70" ((3/2)×100−80). Thus, the data "70" is loaded into the down counter 512 in synchronization with the rising edge of the ITOP signal that has match the clock by using the flip-flop 507.

Upon completion of counting the loaded data "70", the down counter 512 outputs the RC output to the JK flip-flop 513. Upon receiving the RC output from the down counter 512 to the J input, the JK flip-flop 513 changes the Q output, which has remained at the level "L" after being reset at the rising edge of the ITOP signal, to the level "H".

After the Q output at the level "H" is output from the JK flip-flop 513, the AND gate 514 outputs the ITOP signal to the image-write-timing control circuit 101. That is, the phase matching circuit 122 delays the ITOP signal (for "70" clocks in this embodiment) based on the phase difference ("80" clocks in this embodiment) between the BD signal and the ITOP signal.

As a consequence, the first scanning line of the second rotation (second color) matches the laser scanning line recorded on the photosensitive drum 105 relative to the first-scanning BD signal of the first rotation (first color). Accordingly, the first scanning line of the second rotation matches the first scanning line of the first rotation every time 8192 BD signals are output.

By adjusting the position at which the ITOP signal is generated to the middle of the cycle of the BD signal, positional offset caused by a variation in the operation of the photosensitive-drum motor can be sufficiently accommodated merely by improving the precision of the motor and the driving mechanism.

Accordingly, by starting to record images of the respective colors based on the ITOP signal, the start positions at which the images of the first through the n-th colors are recorded can be precisely matched, since the phase difference between the ITOP signal and the BD signal is always uniform regardless of the color, thereby obtaining high quality images free from color shifting.

[Second Embodiment]

In the first embodiment, every time the sub-scanning start signal (ITOP signal) is generated, the period by which the ITOP signal is delayed for performing phase matching is calculated. Alternatively, the period by which the sub-scanning start signal (ITOP signal) for the first rotation is delayed may be calculated for every image forming and output sequence. Based on the calculated period, the sub-scanning start signal for the first rotation and the sub-scanning start signals for the second and subsequent rotations may be delayed. An embodiment constructed in accordance with such a modification is discussed below.

Figure 7:
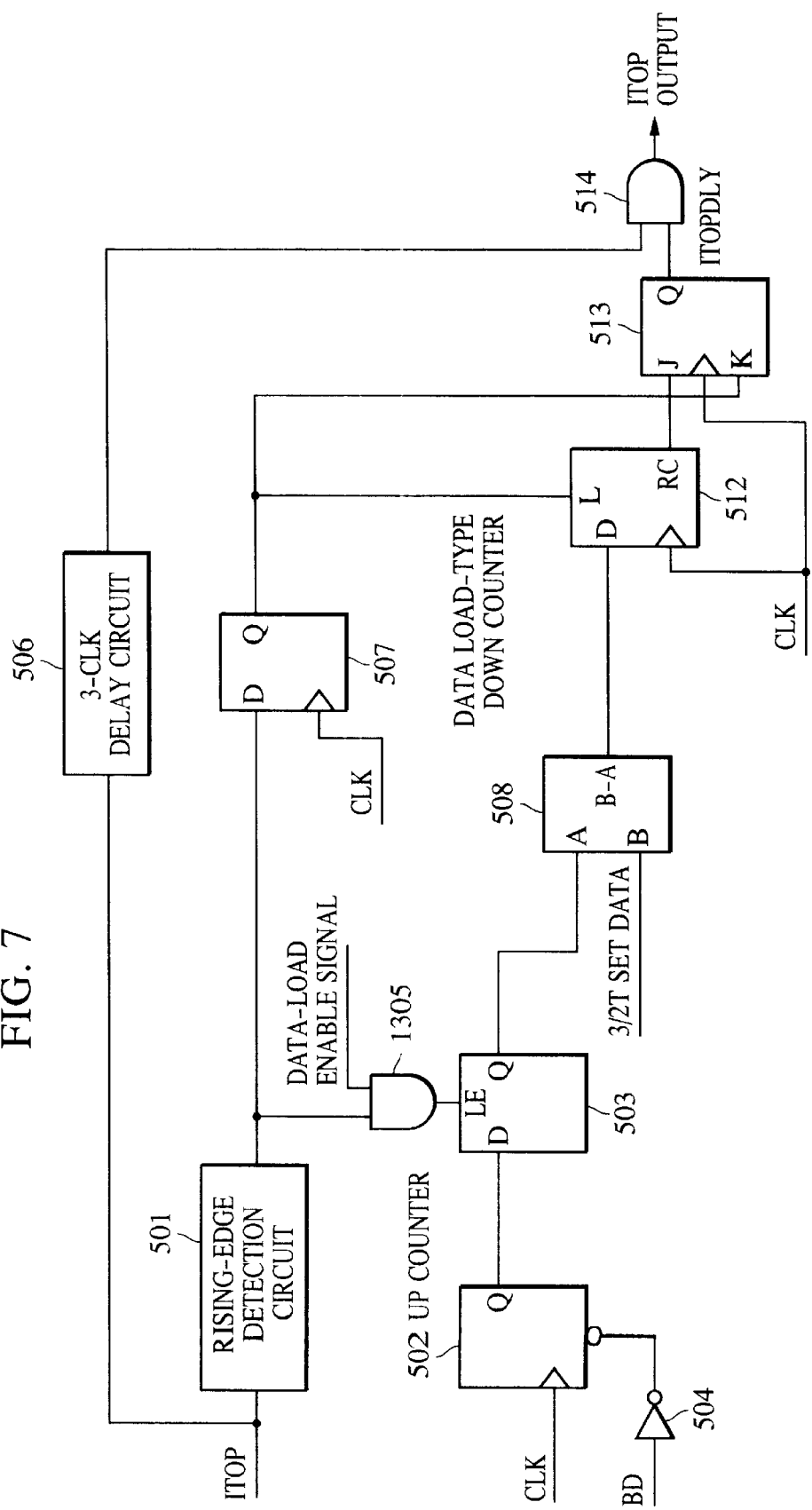
FIG. 7 is a circuit diagram illustrating the configuration of a phase matching circuit for use in an image forming apparatus according to a second embodiment of the present invention.

FIG. 7 is a circuit diagram illustrating the configuration of the phase matching circuit 122 for use in an image forming apparatus according to a second embodiment of the present invention. The same elements as those shown in FIG. 4 are represented by like reference numerals.

In FIG. 7, reference numeral 1305 indicates an AND gate that outputs to the latch enable terminal LE of the latch circuit 503 the logical AND of the output of the rising-edge detection circuit 501 and the data-load enable signal set by the CPU (controller) 130 shown in FIG. 2. When the data-load enable signal from the CPU 130 is at the level "L", the data is not latched in the latch circuit 503 even if the rising edge of the ITOP signal is detected.

Upon receiving the data-load enable signal from the CPU 130, the phase of the ITOP signal and the phase of the BD signal only corresponding to the first rotation are sampled, and the ITOP signal is delayed so that it can be generated at the middle of the cycle of the BD signal. For the second rotation through the n-th rotation, the data-load enable signal from the CPU 130 is set to the "L" level, so that the same data used for the delay operation for the first rotation can be retained. Accordingly, the ITOP signal for the first rotation is generated at the middle of the cycle of the BD signal, and the ITOP signals for the second ad subsequent rotations are generated while being offset from the middle of the cycle of the BD signal in accordance with the mechanical precision of the image forming apparatus, such as the operational precision of the photosensitive-drum motor 115.

A description is given below with reference to FIGS. 8 and 9 of the phase matching operation performed by the image forming apparatus according to the second embodiment of the present invention.

Figure 8:
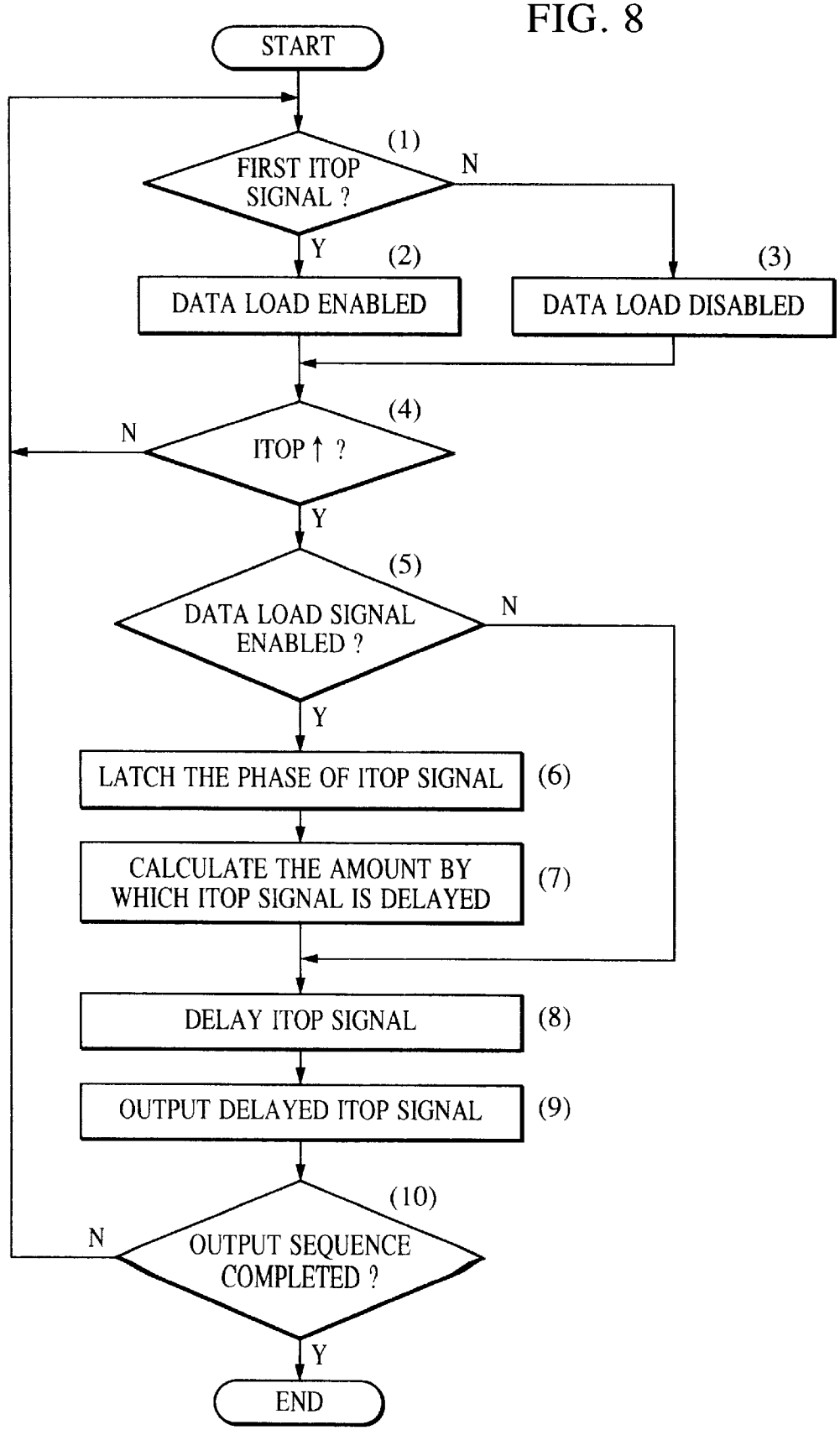
FIG. 8 is a flow chart illustrating a phase matching operation according to the second embodiment of the present invention.

FIG. 8 is a flow chart illustrating the phase matching processing performed by the image forming apparatus according to the second embodiment of the present invention. In the flow chart, (1) through (10) indicate process steps.

Upon starting the image forming and output sequence operation, the CPU 130 determines whether the ITOP signal corresponds to the first rotation (the first color) in (1). If the outcome of (1) is no, the data-load enable signal is set to the level "L" (data load disabled) in (3). If the result of (1) is yes, the data-load enable signal input into the AND gate 1305 is set to the level "H" (data load enabled) in (2).

Subsequently, a determination is made in (4) of whether the rising edge of the ITOP signal has been detected by the rising-edge detection circuit 501. If the outcome of (4) is no, the process returns to (1). If the result of (4) is yes, it is checked in (5) whether the data load signal has been enabled. If it is found in (5) that the data load signal is enabled, the positional data representing the phase of the ITOP signal within the cycle of the BD signal is latched in the latch circuit 503 in (6). It is now assumed that the value set in the subtracting circuit 508 by the CPU 130, for example, the number of counts of the BD cycle (a known value uniquely determined by the image forming apparatus) is represented by T. Then, the phase positional data latched in the latch circuit 503 is subtracted from "(3/2)T", which is 1.5 times T, and the resulting data is determined in (7) as the period by which the ITOP signal is delayed. Subsequently, the calculated period is loaded into the down counter 512, and the ITOP signal is delayed based on the calculated period in (8). The delayed ITOP signal is then output (9). It is further determined in (10) whether the image forming and output sequence has been completed. If the outcome of (10) is no, the process returns to (1), and the output sequence is started again. If the result of (10) is yes, the processing is ended.

If it is found in (5) that the data-load signal is disabled, the ITOP signal is delayed in (8) based on the data which has already been latched in the latch circuit 503. Then, the delayed ITOP signal is output in (9). Thereafter, the CPU 130 determines in (10) whether the image forming and output sequence has been completed. If the outcome of (10) is no, the process returns to (1), and the output sequence is started again. If the result of (10) is yes, the processing is ended.

Figure 9:
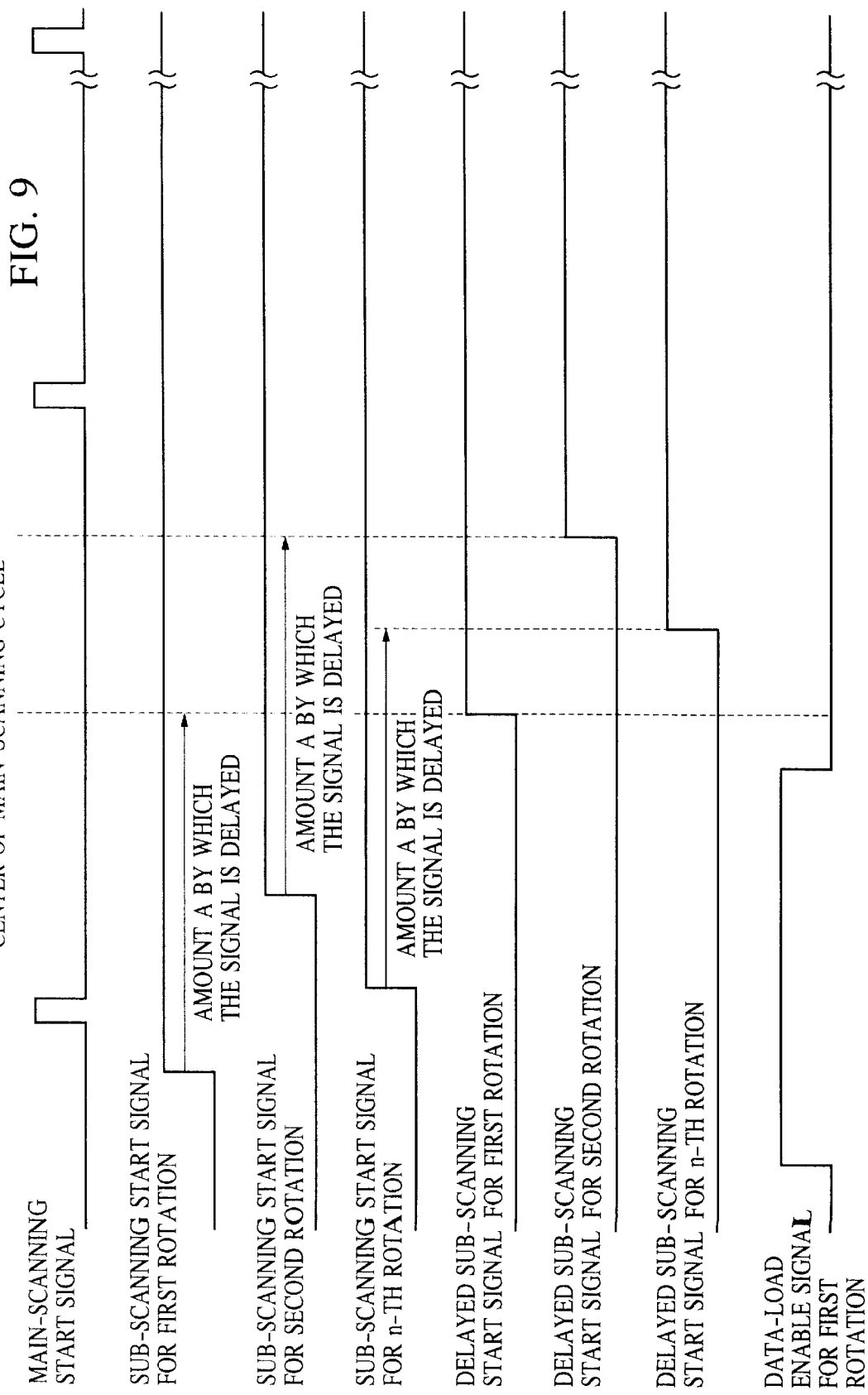
FIG. 9 is a timing chart illustrating the phase matching operation according to the second embodiment of the present invention.

FIG. 9 is a timing chart illustrating the phase matching operation performed by the image forming apparatus according to the second embodiment of the present invention.

In FIG. 9, the sub-scanning start signal (ITOP signal) for the first rotation is generated slightly before the main-scanning start signal. Thus, the period A by which the sub-scanning start signal is delayed for the first rotation (first color) is calculated, since the data-load enable signal is set to the level "H" by the CPU 130 shown in FIG. 2. Based on the calculated period A, the sub-scanning start signal for the first rotation is delayed and then generated at the middle of the cycle of the main-scanning start signal, as shown in FIG. 9.

The sub-scanning start signal (ITOP signal) for the second rotation is generated slightly after the main-scanning start signal. In this case, since the data-load enable signal is set to the level "L" by the CPU 130, the period by which the sub-scanning start signal for the second rotation is delayed is not calculated. Instead, the sub-scanning start signal for the second rotation (second color) is generated, as illustrated in FIG. 9, based on the period A calculated for the first rotation and retained in the latch circuit 503.

The same applies to the sub-scanning start signal for the n-th rotation (n-th color). The sub-scanning start signal for the n-th rotation is delayed for the period A and then generated, as shown in FIG. 9.

As described above, before performing the delaying operation, the sub-scanning start signals were generated before or after the main-scanning start signal. Then, the sub-scanning start signal for the first rotation is delayed for the calculated period A. Based on the period A, the sub-scanning start signals for the second and subsequent rotations can also be delayed so that they can be positioned in the vicinity of the middle of the cycle of the main-scanning start signal. As a result, the offset in the sub-scanning direction can be sufficiently accommodated.

By adjusting the position at which the sub-scanning start signal (ITOP signal) is generated to the middle of the cycle of the main-scanning start signal (BD signal), positional offset caused by variation in the operation of the photosensitive-drum motor can be sufficiently accommodated merely by improving the precision of the motor and the driving mechanism.

Therefore, by starting to record images of the respective colors based on the ITOP signal, the start positions at which the images of the first through the n-th colors are recorded can be precisely matched, since the phase difference between the ITOP signal and the BD signal is always uniform regardless of the color, thereby obtaining high quality images free from color shifting.

[Third Embodiment]

In the second embodiment, the period by which the ITOP signal is delayed is calculated so that the first ITOP signal can be adjusted to the middle of the subsequent cycle of the BD signal. If, however, the ITOP signal is generated before the middle of the cycle of the BD signal, the timing of the input of the ITOP signal may be adjusted to the middle of the current cycle of the BD signal. An embodiment constructed in accordance with such a modification is discussed below.

Figure 10:
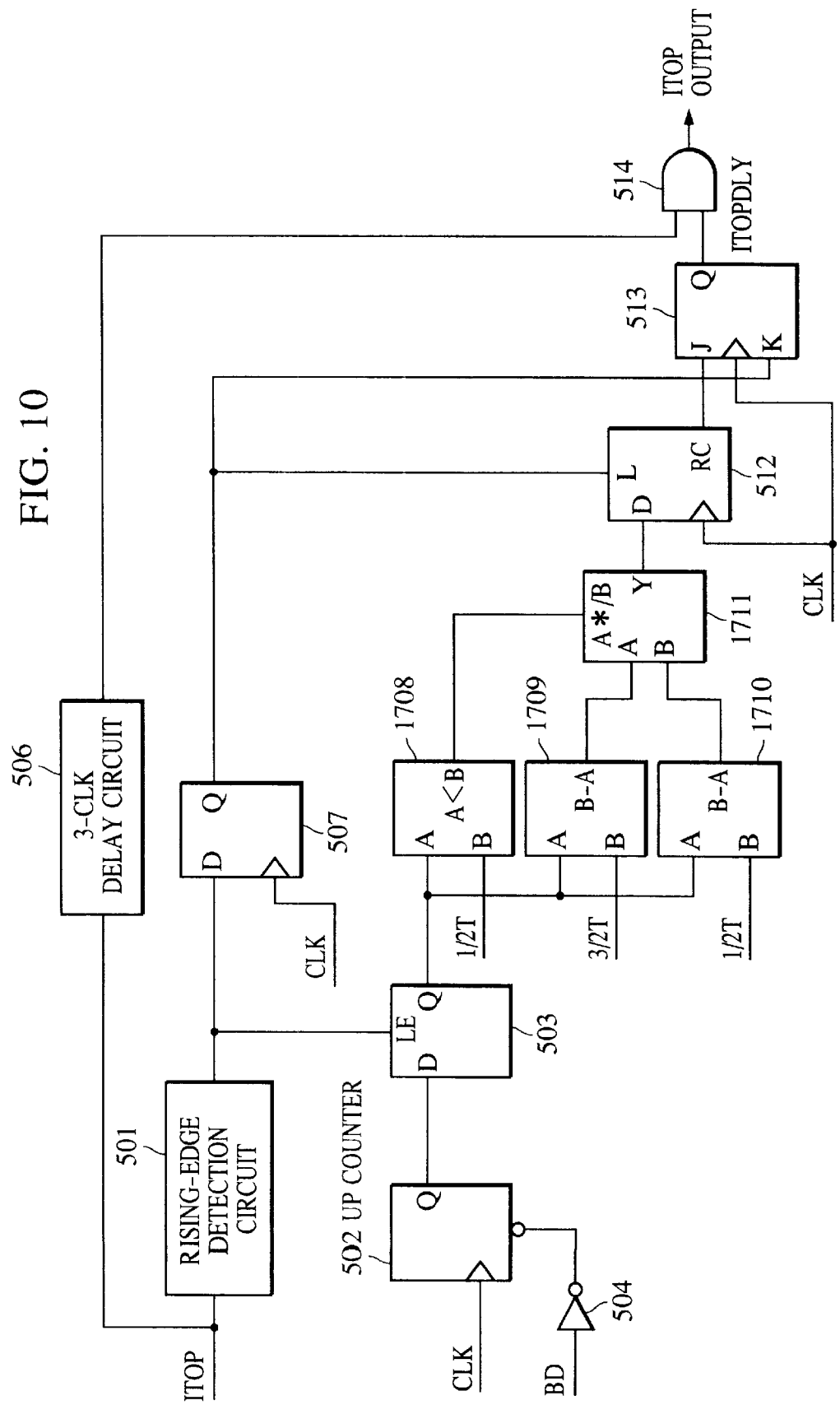
FIG. 10 is a circuit diagram illustrating the configuration of a phase matching circuit for use in an image forming apparatus according to a third embodiment of the present invention.

FIG. 10 is a circuit diagram illustrating the configuration of the phase matching circuit 122 for use in an image forming apparatus according to a third embodiment of the present invention. The same elements as those shown in FIG. 4 are indicated by like reference numerals.

In FIG. 4, a comparator 1708 compares the data latched by the latch circuit 503 (the data representing the position of the rising edge of the ITOP signal in the cycle of the BD signal, i.e., the data representing the phase difference between the ITOP signal and the BD signal) with the data set by the CPU 130. If the latched data is smaller than the set data, the comparator 1708 outputs the level "H". If the latched data is not smaller than the set data, the comparator 1708 outputs the level "L". That is, at the output level "H" from the comparator 1708, the ITOP signal is generated before the middle of the cycle of the BD signal. In contrast, at the output level "L" from the comparator 1708, the ITOP signal is generated at or after the middle of the cycle of the BD signal.

A first subtracting circuit 1709 subtracts the data latched by the latch circuit 503 from the data set by the CPU 130. In this embodiment, when the number of counts of the cycle of the BD signal (a known value which is uniquely determined by the image forming apparatus) is indicated by T, the set data is determined to be "(3/2)T", which is 1.5 times T.

The resulting output of the first subtracting circuit 1709 serves as a period by which the ITOP signal is delayed, i.e., the duration from the input of the ITOP signal, which is generated later than the middle of the cycle of the BD signal, to the middle of the subsequent cycle of the BD signal. More specifically, if the number of counts T of the cycle of the BD signal is set to be "100", and if the ITOP signal is input at a position of the counts "80" (=latched data), it is determined that the ITOP signal is delayed by "70" counts ((3/2)T−80= 150−80). In this manner, the input timing of the ITOP signal can be adjusted to the middle of the subsequent cycle of the BD signal.

A second subtracting circuit 1710 subtracts the data latched by the latch circuit 503 from the data set by the CPU 130. In this embodiment, if the number of counts of the cycle of the BD signal (a known value which is uniquely determined by the image forming apparatus) is represented by T, the set data is determined to be "(½)T", which is ½ times T. The resulting output of the second subtracting circuit 1710 is used as a period by which the ITOP signal is delayed, i.e., the duration from the input of the ITOP signal, which is generated not later than the middle of the cycle of the BD signal, to the middle of the current cycle of the BD signal.

A selector 1711 selects the output of the first subtracting circuit 1709 or the output of the second subtracting circuit 1710 based on the output of the comparator 1708. The selector 1711 then transmits the selected output to the data load terminal of the down counter 512.

When the output of the comparator 1708 is at the level "L", i.e., when the ITOP signal is generated later than the middle of the cycle of the BD signal, the result of the first subtracting circuit 1709 is selected. Conversely, when the output of the comparator 1708 is at the level "H", i.e., when the ITOP signal is generated not later than the middle of the cycle of the BD signal, the result of the second subtracting circuit 1710 is selected. The selected output is then sent to the data load terminal of the down counter 512.

A description is given below with reference to FIG. 11 of the different approaches of the phase matching operation depending on whether the ITOP signal is generated in the first half or the second half of the cycle of the BD signal.

Figure 11A:
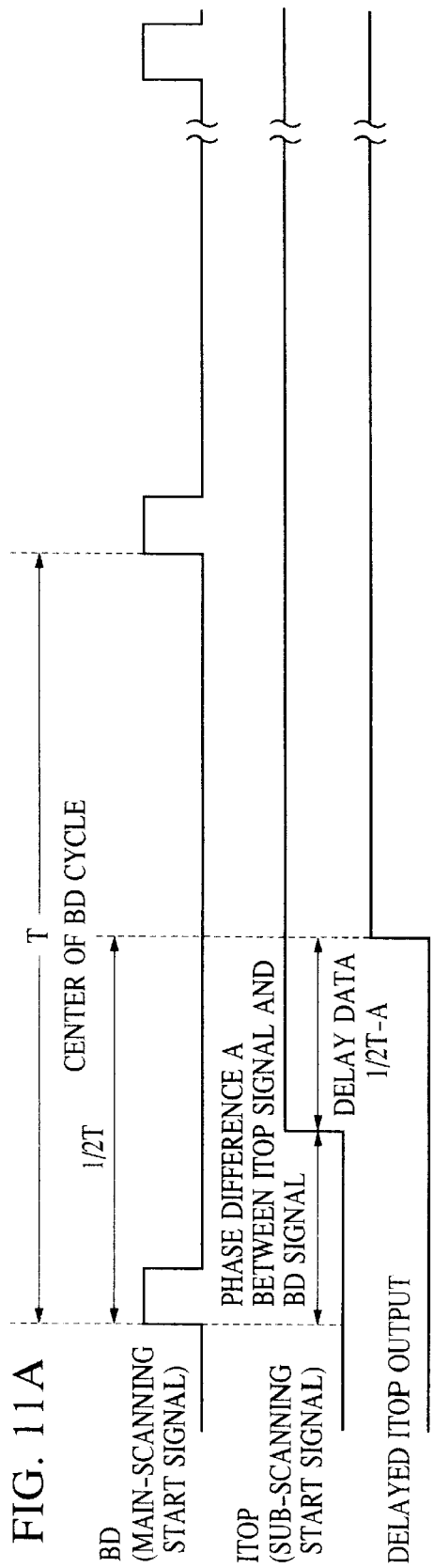
FIGS. 11A and 11B are timing charts illustrating a phase matching operation according to the third embodiment of the present invention.
Figure 11B:
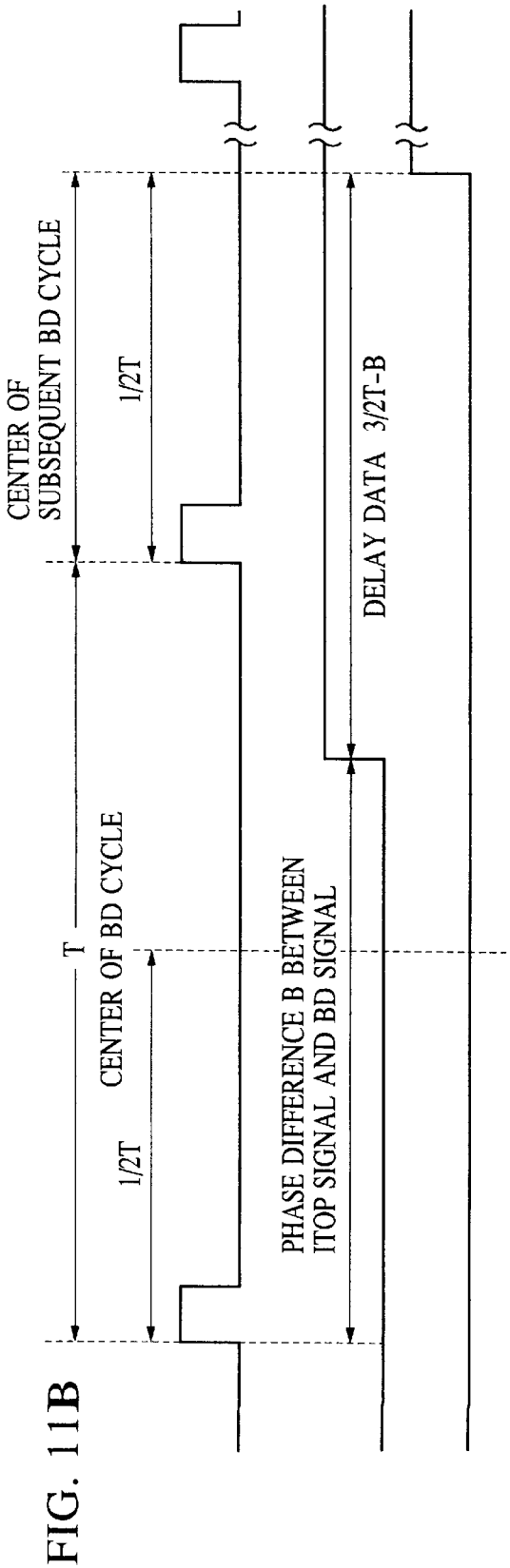

FIGS. 11A and 11B are timing charts illustrating the phase matching operations performed by the image forming apparatus according to the third embodiment of the present invention. FIG. 11A illustrates the phase matching operation when the ITOP signal is input in the first half of the cycle of the BD signal, while FIG. 11B illustrates the phase matching operation when the ITOP signal is input in the second half of the cycle of the BD signal.

In FIG. 11A, in the cycle T of the BD signal, the phase difference A between the ITOP signal and the BD signal results in "A<(½)T". It can thus be assessed that the ITOP signal has been generated in the first half of the cycle of the BD signal.

Accordingly, the ITOP signal has been generated before the middle of the cycle of the BD signal. Thus, the timing of the input of the ITOP signal is adjusted to the middle of the current cycle of the BD signal. This can be achieved by delaying the ITOP signal for a period of "(½)T−A".

In FIG. 11B, in the cycle T of the BD signal, the phase difference B between the ITOP signal and the BD signal results in "B>(½)T". It can thus be assessed that the ITOP signal has been generated in the second half of the cycle of the BD signal.

Since the ITOP signal is generated after the middle of the current cycle of the BD signal, the timing of the input of the ITOP signal should be adjusted to the middle of the subsequent cycle of the BD signal. This can be achieved by delaying the ITOP signal for a period of "(3/2)T−B".

According to the above description, the ITOP signal, which is input in the first half of the cycle of the BD signal, is adjusted to the middle of the current cycle of the BD signal. On the other hand, the ITOP signal, which is input in the second half of the cycle of the BD signal, is adjusted to the middle of the subsequent cycle of the BD signal. It is therefore possible to use the BD signal effectively.

The output data of the selector 1711 input into the data load terminal of the down counter 512 is loaded into the down counter 512 in synchronization with the output of the rising-edge detection circuit 501 that has matched the clock by using the flip-flop 507. Upon completing the counts of the loaded data, the down counter 512 outputs the RC output to the JK flip-flop 513. The period during which the down counter 512 is counting serves as the period by which the ITOP signal is delayed for phase matching.

The JK flip-flop 513 is reset at the rising edge of the ITOP signal, and the Q output ITOPDLY of the JK flip-flop 513 is set at the level "L". The Q output remains at the level "L" until the RC output of the down counter 512 has been output and set.

That is, the Q output remains at the level "L" for a period required for delaying the ITOP signal after the rising edge of the ITOP signal. The ITOPDLY output and the delayed ITOP signal for a predetermined period (3 CLKs in this embodiment) are output via the AND gate 514. As a consequence, the ITOP signal can be generated at the middle of the cycle of the BD signal.

As a consequence, the first scanning line of the second rotation matches the laser scanning line recorded on the photosensitive drum 105 relative to the first-scanning BD signal for the first rotation. Accordingly, the first scanning line of the second rotation matches the first scanning line of the first rotation every time 8192 BD signals are output. Further, the ITOP signal, which is input in the first half of the cycle of the BD signal, is adjusted to the middle of the current cycle of the BD signal. In contrast, the ITOP signal, which is input in the second half of the cycle of the BD signal, is adjusted to the middle of the subsequent cycle of the BD signal. The BD signal can therefore be effectively utilized.

By adjusting the position at which the ITOP signal is generated to the middle of the cycle of the BD signal, positional offset caused by a variation in the operation of the photosensitive-drum motor can be sufficiently accommodated merely by improving the precision of the motor and the driving mechanism.

Accordingly, by starting to record images of the respective colors based on the ITOP signal, the start positions at which the images of the first through the n-th colors are recorded can be precisely matched, since the phase difference between the ITOP signal and the BD signal is always uniform regardless of the color, thereby obtaining high quality images free from color shifting.

As discussed in the description of the related art, a known image forming apparatus for forming a multi-colored image by superimposing a plurality of plane images presents the following problem. The timing of the input of the sub-scanning start signal in relation to the main-scanning start signal deviates from the ideal timing even when employing techniques for preventing positional offset of the individual plane images by improving the configuration of the apparatus. According to this embodiment, however, for the formation of each plane image, the timing of the generation of the sub-scanning start signal in relation to the main-scanning start signal is perfectly adjusted. With this arrangement, the positions at which the recording of the respective plane images is started are always the same, thereby offering high quality images free from color shifting.

[Fourth Embodiment]

In the first through the third embodiments, based on the phase difference between the sub-scanning start signal (ITOP signal) and the main-scanning start signal (BD signal), the sub-scanning start signal is delayed so that it can be generated at the middle of the cycle of the main-scanning start signal. The foregoing embodiments may be modified in the following manner if the phase difference between the main-scanning start signal and the sub-scanning start signal generated by a variation in the rotational speed of a photosensitive member, which is caused by load variation or a backlash of a driving transfer gear, is within "⅓" away from the cycle T of the BD signal. In this case, based on the phase difference between the sub-scanning start signal and the main-scanning start signal, the sub-scanning start signal may be delayed so that it can be generated within "⅓" cycle from the middle of the cycle of the main-scanning start signal. An embodiment constructed in accordance with such a modification is discussed below.

FIGS. 12A and 12B illustrate the relationship between the phase of main-scanning start signal and the phase of the sub-scanning start signal in an image forming apparatus according to a fourth embodiment of the present invention. FIG. 12A illustrates the phase relationship between the ITOP signal and the BD signal when the ITOP signals for the first color are generated near the leading edge and the trailing edge of the cycle of the BD signal. FIG. 12B illustrates the phase relationship between the ITOP signal and the BD signal when the ITOP signals for the second and subsequent colors are not generated after the BD signal.

In FIG. 12A, the ITOP signal ① for the first color is generated in the phase difference A slightly before BD2 (in the vicinity of the trailing edge of the cycle of the BD signal). Accordingly, there is a possibility that the ITOP signals for the second and subsequent colors will be offset by a maximum of "⅓ lines, that is, they may be generated within a period, which is "(⅓)T" before and after the rising of the ITOP signal for the first color, i.e., in any position within the period indicated by B in FIG. 12A.

It is now assumed that the cycle of the BD signal is represented by T. Since the phase difference A between the ITOP signal for the first color and the BD signal is smaller than "(⅓)T", the ITOP signals for the second and subsequent colors may be generated, as shown in FIG. 12A, after BD2. In this case, even though the position at which the image for the first color is recorded is started from BD2, the position at which the image for the second color is recorded is started from BD3. Even if the actual positional offset due to the phase difference between the ITOP signal and the BD signal is only "⅓" lines, a maximum positional offset of one line occurs.

Similarly, the ITOP signal ② for the first color is generated in the phase difference A' slightly after BD1 (in the vicinity of the leading edge of the cycle of the BD signal). Accordingly, there is a possibility that the ITOP signals for the second and subsequent colors will be offset by a maximum of "⅓" lines, that is, they may be generated within a period, which is "(⅓)T" before and after the rising of the ITOP signal for the first color, i.e., in any position within the period indicated by B' in FIG. 12A.

Since the phase difference A' between the ITOP signal for the first color and the BD signal is smaller than "(⅓)T", the ITOP signals for the second and subsequent colors may be generated, as shown in FIG. 12A, after BD1. In this case, even though the position at which the image of the first color is recorded is started from BD1, the position at which the image of the second color is recorded is started from BD2. Even if the actual positional offset caused by the phase difference between the ITOP signal and the BD signal is only "⅓" lines, a maximum positional offset of one line occurs.

In order to prevent the ITOP signals for the second and subsequent colors from being generated after the BD signal, the BD signal for the first color should be positioned away from the adjacent ITOP signals by "(⅓)T" or more. The above phase relationship between the ITOP signal and the BD signal is as follows.

The hatched portion C shown in FIG. 12B is a period positioned from the adjacent BD signals by "(⅓)T" or more. That is, if the ITOP signal for the first color is generated within the hatched portion C, the ITOP signals for the second and subsequent colors can be prevented from being generated after the corresponding BD signal even if they are offset by a maximum of "⅓" lines.

Figure 13:
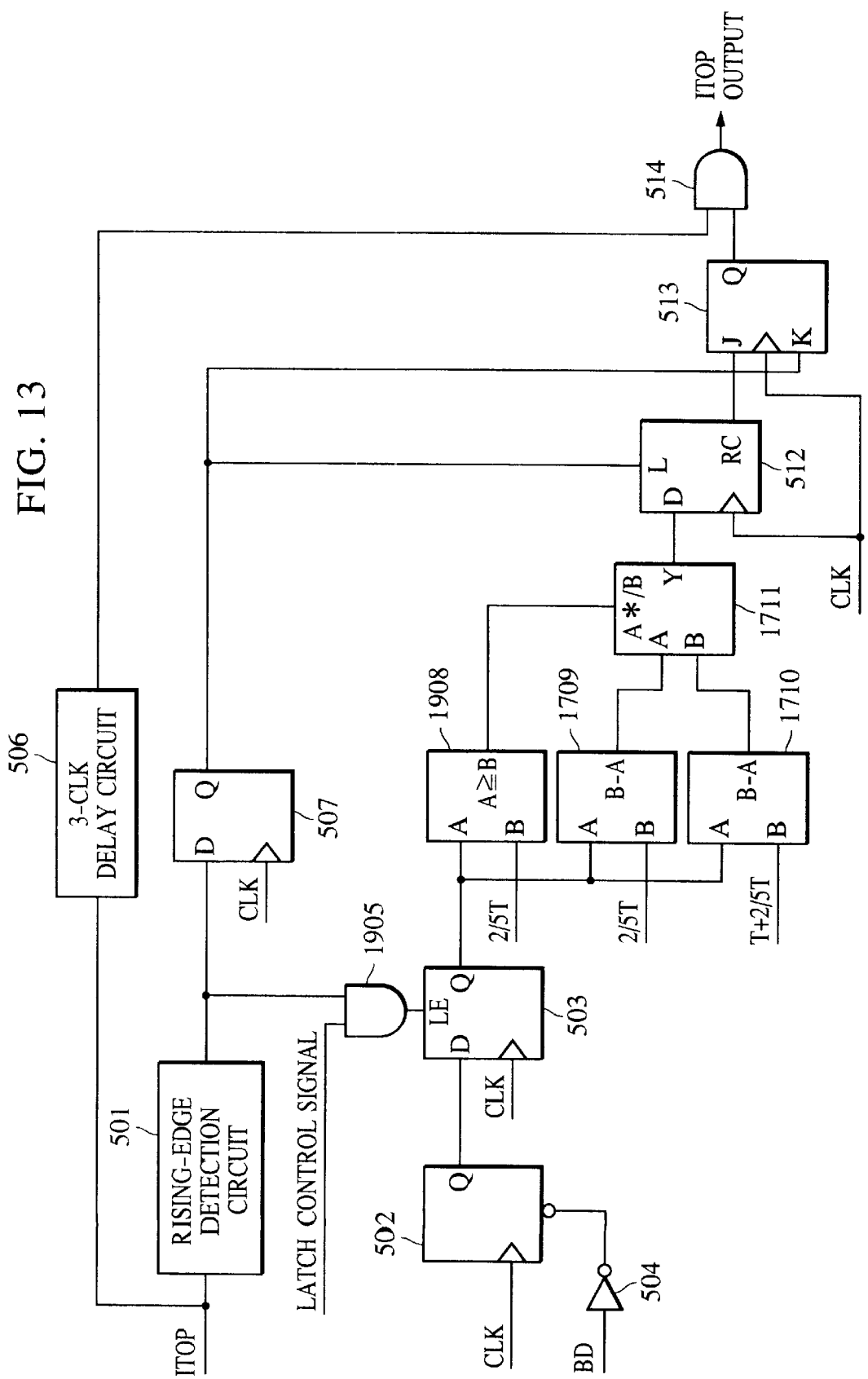
FIG. 13 is a circuit diagram illustrating the configuration of a phase matching circuit according to the fourth embodiment of the present invention.

FIG. 13 is a circuit diagram illustrating the configuration of the phase matching circuit 122 for use in the image forming apparatus according to the fourth embodiment of the present invention. The same elements as those shown in FIG. 10 are designated with like reference numerals.

In FIG. 13, an AND gate 1905 calculates the logical AND of the output of the rising-edge detection circuit 501 and the data-load enable signal set by the CPU (controller) 130 shown in FIG. 2 and outputs the logical AND to the latch enable terminal LE of the latch circuit 503. In response to the data-load enable signal "L" from the CPU 130, the latch circuit 503 does not latch the data even if the rising edge of the ITOP signal is detected.

By inputting the data-load enable signal from the CPU 130, the phase of the BD signal and the phase of the ITOP signal only corresponding to the first rotation are sampled, and the ITOP signal is delayed so that it can be generated at the middle of the cycle of the BD signal. Then, for the second rotation through the n-th rotation, the data-load enable signal from the CPU 130 is set at the level "L". This makes it possible to retain the same data used for the delay operation for the first rotation. Accordingly, the ITOP signal for the first rotation is generated at the middle of the cycle of the BD signal, and the ITOP signals for the second and subsequent rotations are generated while being offset from the position of the ITOP signal for the first color in accordance with the mechanical precision of the image forming apparatus, such as the operational precision of the photosensitive-drum motor 115.

It is now assumed in this embodiment that the number of counts of the cycle of the BD signal (a known value uniquely determined by the image forming apparatus) is represented by T. In FIG. 13, a comparator 1908 compares the data latched in the latch circuit 503 (the data representing the position of the rising edge of the ITOP signal for the first rotation in the cycle of the BD signal, i.e., the data representing the phase difference between the ITOP signal for the first rotation and the BD signal) with the data set by the CPU 130, i.e., "(2/5)T", which is 2/5 times T. If the latched data is not smaller than set data, the comparator 1908 outputs the level "H". If the latched data is smaller than the set data, the comparator 1908 outputs the level "L". That is, at the output level "H", the ITOP signal has been generated at n(2/5)T" or after the start of the cycle of the BD signal. On the other hand, at the output level "L", the ITOP signal has been generated before "(2/5)T" from the start of the cycle of the BD signal.

The first subtracting circuit 1709 subtracts the data latched in the latch circuit 503 from the data set by the CPU 130, i.e., "(2/5)T". The output of the first subtracting circuit 1709 is used as a period by which the ITOP signal, which has been generated before "(2/5)T" from the start of the BD signal, is delayed, i.e., the duration from the input of the ITOP signal to the position away from the BD signal by "(2/5)T". That is, if the number of counts T of the cycle of the BD signal is "100", and if the ITOP signal is input at the position of "20" (=latched data), the ITOP signal should be delayed by "20" counts ((2/5)T−20=40−20). This makes it possible to input the ITOP signal at a position away from the BD signal by "(2/5)T".

The second subtracting circuit 1710 subtracts the data latched in the latch circuit 503 from the data set by the CPU 130 (the set data is "T+(2/5)T", which is "1+(2/5)" times T in this embodiment).

The output of the second subtracting circuit 1710 is used as a period by which the ITOP signal, which has been generated at the "(2/5)T" or after from the start of the BD signal, is delayed, i.e., the duration from the input of the ITOP signal to the position away from the subsequent BD signal by "(2/5)T". That is, if the number of counts T of the cycle of the BD signal is "100", and if the ITOP signal is input at the position of "80" (=latched data), the ITOP signal should be delayed by "60" counts (T+(2/5)T−80=140−80). This makes it possible to input the ITOP signal at a position away from the subsequent BD signal by "(2/5)T".

The selector 1711 selects the result of the first subtracting circuit 1709 when the output level from the comparator 1908 is "L", i.e., when the ITOP signal has been generated before "(2/5)T" from the start of the BD signal. Conversely, the selector 1711 selects the outcome of the second subtracting circuit 1710 when the output level from the comparator 1908 is "H", i.e., when the ITOP signal has been generated at "(2/5)T" or after from the start of the BD signal. Then, the selected output is sent to the data load terminal of the down counter 512.

Figure 14:
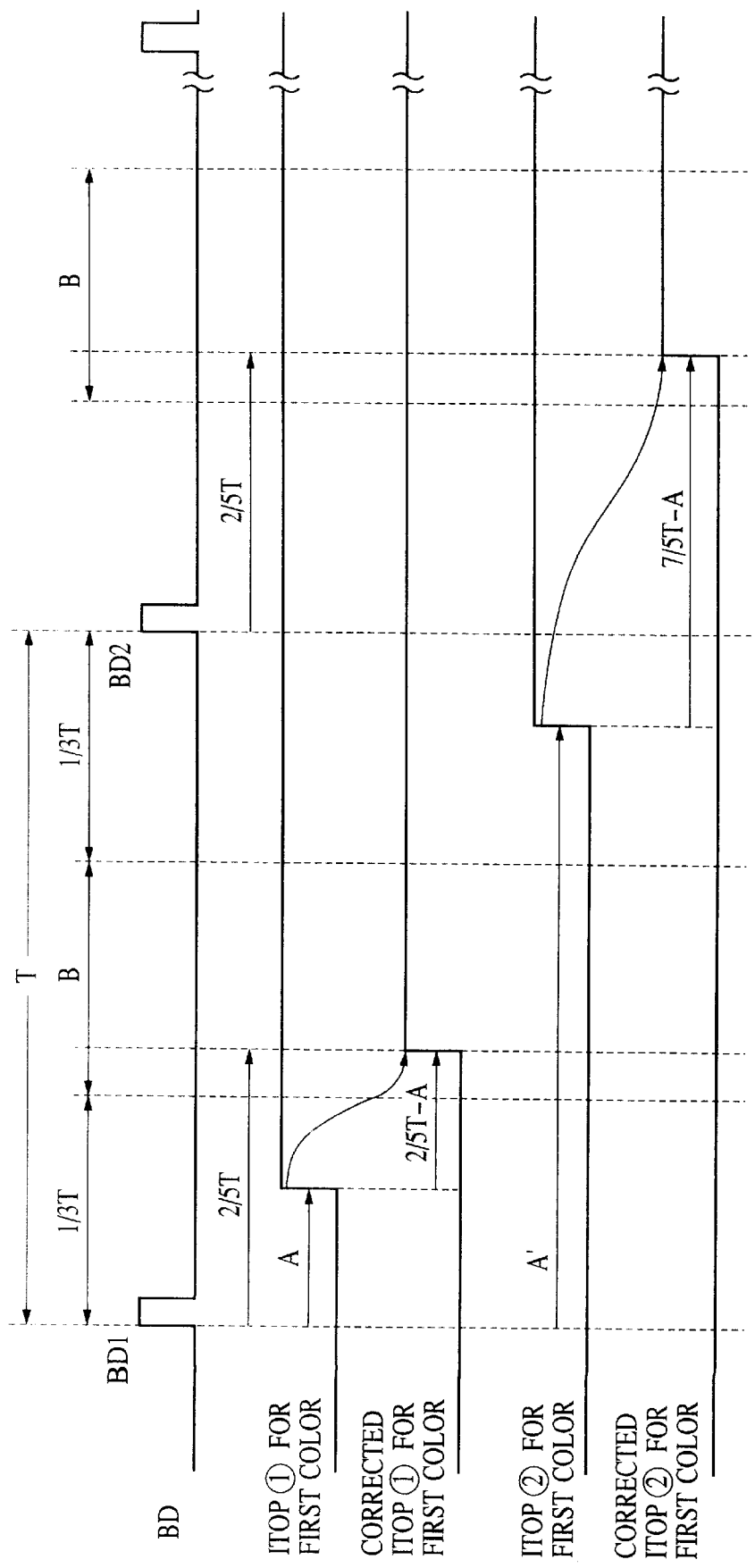
FIG. 14 is a timing chart illustrating a phase matching operation according to the fourth embodiment of the present invention.

FIG. 14 is a timing chart illustrating the phase matching operation performed by the image forming apparatus according to the fourth embodiment of the present invention. In FIG. 14, the ITOP signal for the first color is generated away from the previous BD signal by "2/5" lines so that the ITOP signal can be positioned away from the adjacent BD signals by "1/3" lines or greater.

Referring to FIG. 14, the ITOP signal ① for the first color is generated from BD1 by A (A<(2/5)T). Accordingly, in order to position the ITOP signal away from the BD signal by "2/5T", the ITOP signal is required to be delayed by "(2/5)T−A', as indicated by the corrected ITOP signal ① for the first color.

The ITOP signal ② for the first color is generated away from BD1 by A', i.e., the ITOP signal ② is generated at a position within "(2/5)T" away from BD2. Thus, in order to position the ITOP signal away from the BD signal by "2/5T", it is necessary to delay the ITOP signal by "(7/5)T−A", as represented by the corrected ITOP signal ② for the first color.

The above-described phase matching operation is discussed in detail below with reference to FIGS. 13 and 14.

The latch circuit 503 latches the output of the UP counter 502 upon detecting by the rising-edge detection circuit 501 the rising edge of the ITOP signal for the first rotation, which is generated from the ITOP sensor 110 disposed within the transfer drum 108. The latched count data is then input into the comparator 1908, and the first and second subtracting circuits 1709 and 1710. The comparator 1908 compares the latched count data with the data set by the CPU 130. When the number of counts of the cycle of the BD signal is represented by T, the set data is "(2/5)T", which is "2/5" times T.

At the timing of the input of the ITOP signal ① for the first color shown in FIG. 14, the output of the latch circuit 503 is smaller than "(2/5)T", and thus, the output of the comparator 1908 becomes "L". Accordingly, the output of the first subtracting circuit 1709, i.e., "(2/5)T−A', is selected by the selector 1711. The output of the first subtracting circuit 1709 is used as a period by which the ITOP signal is delayed, i.e., the duration from the input of the ITOP signal to the position away from the start of the BD signal by "2/5" lines.

That is, if the number of counts T of the cycle of the BD signal is "100", and if the ITOP signal is input at the position of counts "20" (=latched data), the ITOP signal is delayed by "20" counts ((2/5)T−20=40−20). This makes it possible to adjust the input of the ITOP signal at a position away from the BD signal by "2/5" lines.

At the timing of the ITOP signal ② for the first color shown in FIG. 14, the output of the latch circuit 503 is greater than "(2/5)T", the output of the comparator 1908 becomes at the level "H". Accordingly, the outcome of the second subtracting circuit 1710, i.e., "T+(2/5)T−A" is selected by the selector 1711.

The output of the second subtracting circuit 1710 serves as a period by which the ITOP signal is delayed, i.e., the duration from the input of the ITOP signal to the position away from BD2 by "(2/5)" lines. That is, if the number of counts T of the cycle of the BD signal is "100", and if the ITOP signal is input at the position of counts "80" (=latched data), the ITOP signal is delayed for "60" counts (T+(2/5)T−80=100+40−80). This makes it possible to input the ITOP signal at the position away from BD2 by "2/5" lines.

As discussed above, the output data of the first subtracting circuit 1709 or the second subtracting circuit 1710 is selected by the selector 1711. The data is then input into the data load terminal of the down counter 512, and is further loaded into the down counter 512 in synchronization with the output of the rising-edge detection circuit 501 that has matched the clock by using the flip-flop 507.

Upon completing the counts of the loaded data, the down counter 512 sends the RC output to the JK flip-flop 513. The period during which the down counter 512 is counting serves as a period by which the ITOP signal is required to be delayed for phase matching. The JK flip-flop 513 is reset at the rising edge of the ITOP signal, and the Q output ITOPDLY is set to the level "L". The Q output remains at the level "L" until the RC output of the down counter 512 has been output and set.

That is, the Q output remains at the level "L" for a period necessary for delaying the ITOP signal after the rising edge of the ITOP signal. The ITOPDLY output and the delayed ITOP signal for a predetermined period (3 CLKs in this embodiment) are output via the AND gate 514. As a consequence, the ITOP signal can be generated at a position away from the BD signal by "(2/5)T".

By inputting the above-described data-load enable signal, the phase of the BD signal and the phase of the ITOP signal only corresponding to the first rotation are sampled, and the ITOP signal is delayed so that it can be generated at a position away from the BD signal by "(2/5)T". Then, for the second rotation through the n-th rotation, the data-load enable signal is set at the level "L". This makes it possible to retain the same data used for the delay operation for the first rotation. Accordingly, the ITOP signal for the first rotation is generated at a position away from the BD signal by "(2/5)T", and the ITOP signals for the second and subsequent rotations are generated while being offset from the position of the ITOP signal for the first rotation in accordance with the mechanical precision of the image forming apparatus, such as the operational precision of the photosensitive-drum motor 115.

In this embodiment, the distance of the ITOP signal that should be away from the BD signal is set to be "2/5" lines or greater. However, the ITOP signal may be away from the BD signal by a range from "1/3" to "1/2" lines. If the amount of offset caused by the difference between the ITOP signal and the BD signal is less than "1/3" lines, for example, "1/n", the ITOP signal may be positioned away from the BD signal by a range from "1/n" to "1/2". In such modifications, advantages similar to those offered by this embodiment may be obtained.

Additionally, in this embodiment, the ITOP signal is adjusted to be positioned from the BD signal relative to the BD signal immediately before the input of the ITOP signal. However, the BD signal immediately after the generation of the ITOP signal may be used as a reference.

[Fifth Embodiment]

In the fourth embodiment, the sub-scanning start signal is delayed so that it can be positioned within "1/3T" from the middle of the main-scanning start signal if the phase difference between the main-scanning start signal and the sub-scanning start signal, which is caused by variation in the rotational speed of the photosensitive member due to load variation or a backlash of a driving transfer gear, is within "1/3" of the cycle T of the BD signal. If the above phase difference between the main-scanning start signal and the sub-scanning start signal is within "1/4" the cycle T of the BD signal, the sub-scanning start signal may be delayed so that it can be generated within "1/4T" from the middle of the main-scanning start signal. An embodiment constructed in accordance with such a modification is discussed below.

Figure 15:
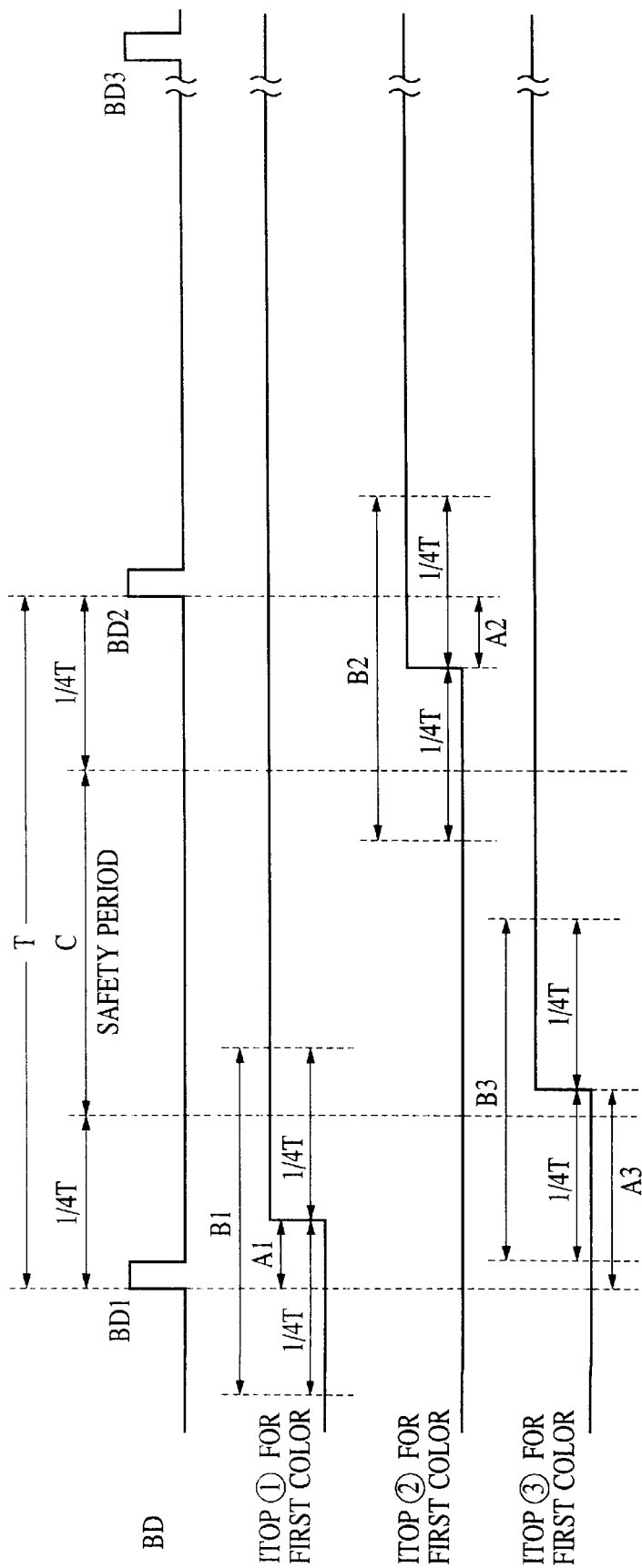
FIG. 15 is a timing chart illustrating the relationship between a main-scanning start signal and a sub-scanning start signal according to a fifth embodiment of the present invention.

FIG. 15 illustrates the phase relationship between the main-scanning start signal and the sub-scanning start signal in an image forming apparatus according to a fifth embodiment of the present invention.

In FIG. 15, a safety period C is a period that is positioned from the adjacent BD signals by "1/4T" or more.

The ITOP signal ① for the first color is generated in phase difference A1 slightly after the generation of BD1 (in the vicinity of the leading edge of the cycle of the BD signal). Accordingly, there is a possibility that the ITOP signals for the second and subsequent colors will be offset by a maximum of "1/4" lines, i.e., they may be generated within "1/4" before and after the start of the ITOP signal for the first color, i.e., in any position within the period indicated by B1 shown in FIG. 15.

It is now assumed that the cycle of the BD signal is represented by T. Since the phase difference A1 is smaller than "(1/4)T", the ITOP signals for the second and subsequent colors may be generated before BD1, as illustrated in FIG. 15. In this case, even though the position at which the image for the first color is recorded is started from BD2, the position at which the image for the second color is recorded is started from BD1. Even if the actual positional offset due to the phase difference between the ITOP signal and the BD signal is only "1/4" lines or less, a maximum positional offset of one line occurs.

Likewise, the ITOP signal ② for the first color is generated in the phase difference A2 slightly before BD2 (in the vicinity of the trailing edge of the cycle of the BD signal). Accordingly, there is a possibility that the ITOP signals for the second and subsequent colors will be offset by a maximum of "1/4" lines, that is, they may be generated within a period, which is "(1/4)T" before and after the rising of the ITOP signal for the first color, i.e., in any position within the period indicated by B2 in FIG. 15.

Since the phase difference A2 between the ITOP signal for the first color and the BD signal Is smaller than "(1/4)T", the ITOP signals for the second and subsequent colors may be generated, as shown in FIG. 15, after BD2. In this case, the position at which the image of the first color is recorded is started from BD2, and the position at which the image of the second color is recorded is started from BD3. Even if the actual positional offset caused by the phase difference between the ITOP signal and the BD signal is only "1/4" lines or less, a maximum positional offset of one line occurs.

The ITOP signal ③ for the first color is generated within the safety period C. The ITOP signals for the second and subsequent colors may be, however, offset by a maximum of "1/4" lines, that is, they may be generated within the period "(1/4)T" before and after the rising edge of the ITOP signal for the first color, i.e., within any position of the period indicated by B3 shown in FIG. 15.

The phase difference A3 between the ITOP signal for the first color and the BD signal is greater than "(1/4)T" and smaller than "(3/4)T". Accordingly, even if the ITOP signals for the second and subsequent colors are offset by a maximum of "(1/4)" lines, the ITOP signals can be prevented from being generated before BD1 or after BD2. This can be achieved by controlling the ITOP signal for the first color to be generated within the safety period C.

Figure 16:
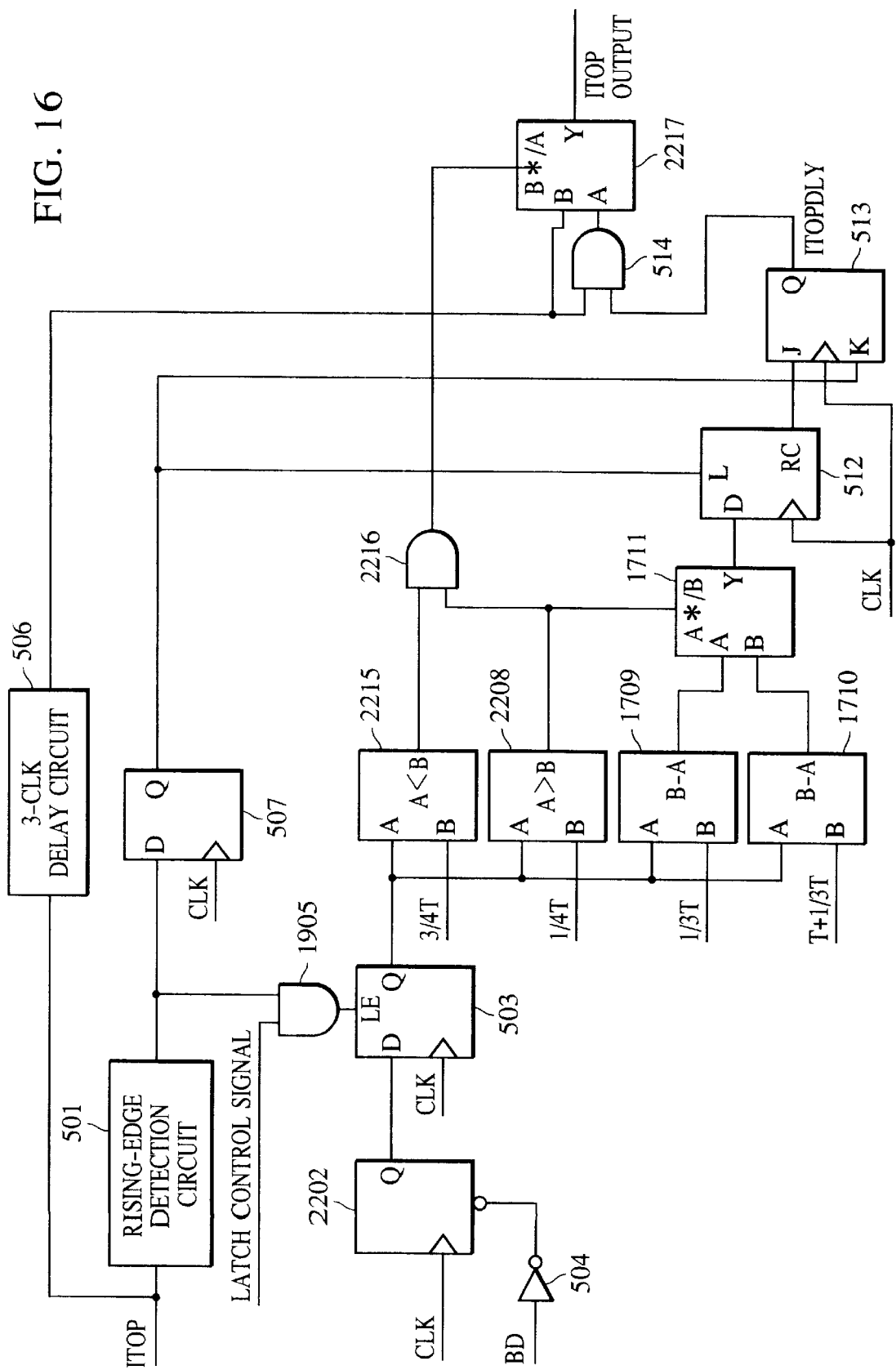
FIG. 16 is a circuit diagram illustrating the configuration of a phase matching circuit according to the fifth embodiment of the present invention.

FIG. 16 is a circuit diagram illustrating the configuration of the phase matching circuit 122 for use in the image forming apparatus according to the fifth embodiment of the present invention. The same elements as those shown in FIG. 13 are designated with like reference numerals.

It is now assumed in this embodiment that the number of counts of the cycle of the BD signal (a known value uniquely determined by the image forming apparatus) is represented by T. In FIG. 16, a comparator 2215 compares the data latched in the latch circuit 503 (the data representing the position of the rising edge of the ITOP signal for the first rotation in the cycle of the BD signal, i.e., the data representing the phase difference between the ITOP signal for the first rotation and the BD signal) with the data set by the CPU 130, i.e., "(3/4)T", which is 3/4 times T. If the latched data is smaller than set data, the comparator 2215 outputs the level "H". If the latched data is not smaller than the set data, the comparator 2215 outputs the level "L".

That is, at the output level "H", the ITOP signal has been generated before "(3/4)T" from the start of the cycle of the BD signal. On the other hand, at the output level "L", the ITOP signal has been generated at "(3/4)T" or after from the start of the cycle of the BD signal.

A comparator 2208 compares the data latched in the latch circuit 503 with the data set by the CPU 130, i.e., "(1/4)T". If the latched data is greater than the set data, the comparator 2208 outputs the level "H". If the latched data is not greater than the set data, the comparator 2208 outputs the level "L".

That is, at the output level "H", the ITOP signal has been generated after "(1/4)T" from the start of the cycle of the BD signal. In contrast, at the output level "L", the ITOP signal has been generated at "(1/4)T" or before from the start of the cycle of the ITOP signal.

The first subtracting circuit 1709 subtracts the data latched in the latch circuit 503 from the data set by the CPU 130, i.e., m(1/3)T". The output of the first subtracting circuit 1709 is used as a period by which the ITOP signal, which has been generated before "(1/4)T" from the start of the BD signal, is delayed, i.e., the duration from the input of the ITOP signal to the position away from the BD signal by "(1/3)T". With this period of delay, the ITOP signal is generated at a position away from the subsequent BD signal by "(1/3)T".

The second subtracting circuit 1710 subtracts the data latched in the latch circuit 503 from the data set by the CPU 130 (the set data is "T+(⅓)T", which is "1+(⅓)" times T in this embodiment).

The output of the second subtracting circuit 1710 is used as a period by which the ITOP signal, which has been generated after the "(¼)T" from the start of the BD signal, is delayed, i.e., the duration from the input of the ITOP signal to the position away from the subsequent BD signal by "(2/5)". With this period of delay, the ITOP signal can be generated at a position away from the subsequent BD signal by "(¼)T".

The selector 1711 selects the result of the first subtracting circuit 1709 when the output level from the comparator 2208 is "L", i.e., when the ITOP signal has been generated before "(¼)T" from the start of the BD signal. Conversely, the selector 1711 selects the outcome of the second subtracting circuit 1710 when the output level from the comparator 2208 is "H", i.e., when the ITOP signal has been generated at "(¼)T" or after from the start of the BD signal. Then, the selected output is sent to the data load terminal of the down counter 512.

An AND gate 2216 calculates the logical AND of the output of the comparator 2215 and the output of the comparator 2208. That is, if the ITOP signal is generated after "(¼)T" and before "(¾)T" of the cycle of the BD signal, the AND gate 2216 outputs the level "H". Conversely, if the ITOP signal is generated before "(¼)T" or after "(¾)T", the AND gate 2216 outputs the level "L".

If the output of the AND gate 2216 is at the level "L", a selector 2217 selects the output of the 3-CLK delay circuit 506 and outputs the ITOP signal which is not delayed (more precisely, the ITOP signal delayed for a predetermined period (3 CLKs in this embodiment) for timing matching) to the image-write-timing control circuit 101.

On the other hand, if the output of the AND gate 2216 is at the level "H", the selector 2217 selects the output of the AND gate 514 and outputs the ITOP signal delayed for a period calculated by the first subtracting circuit 1709 or the second subtracting circuit 1710.

Figure 17:
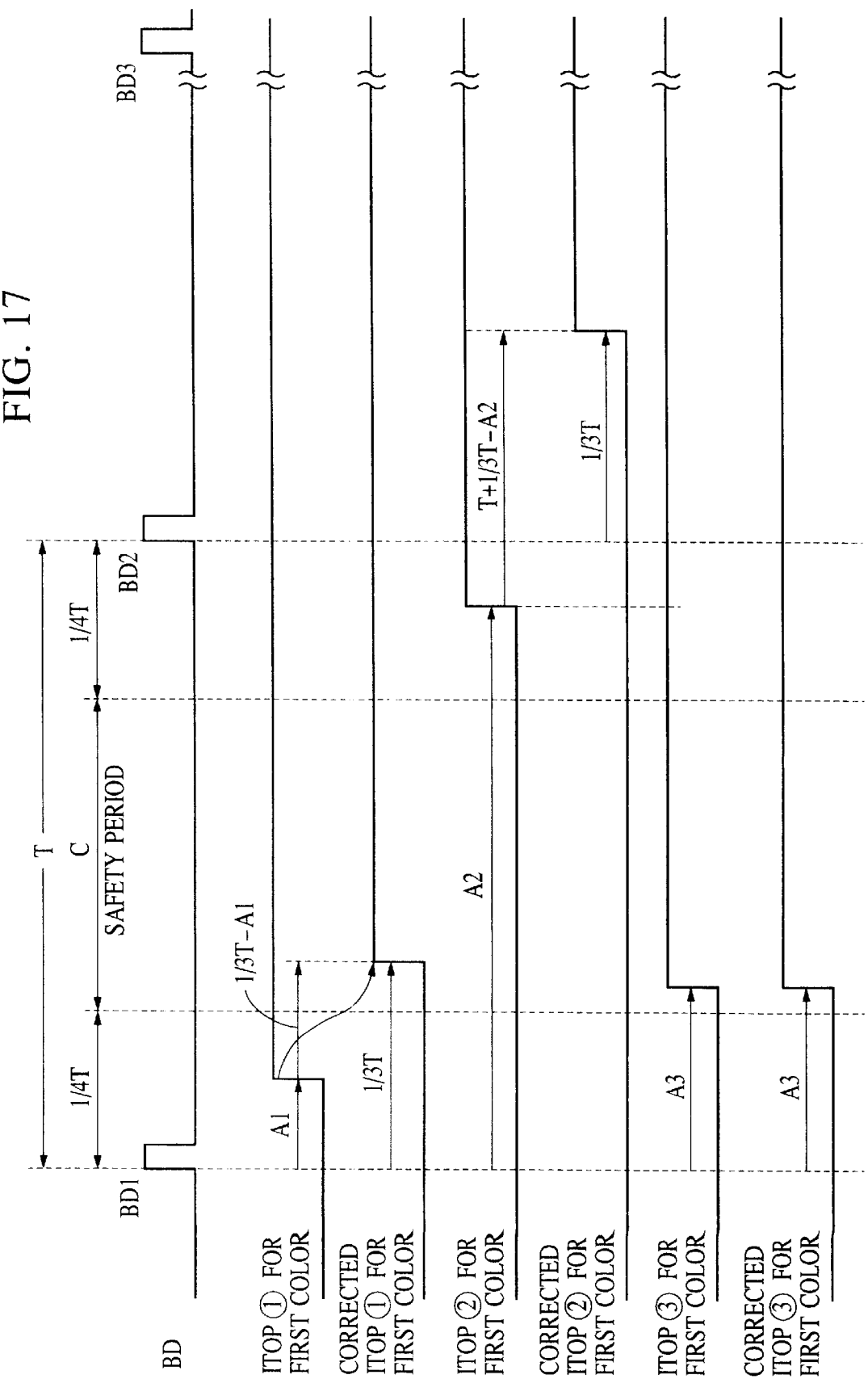
FIG. 17 is a timing chart illustrating the phase matching operation according to the fifth embodiment of the present invention.
Figure 18A:
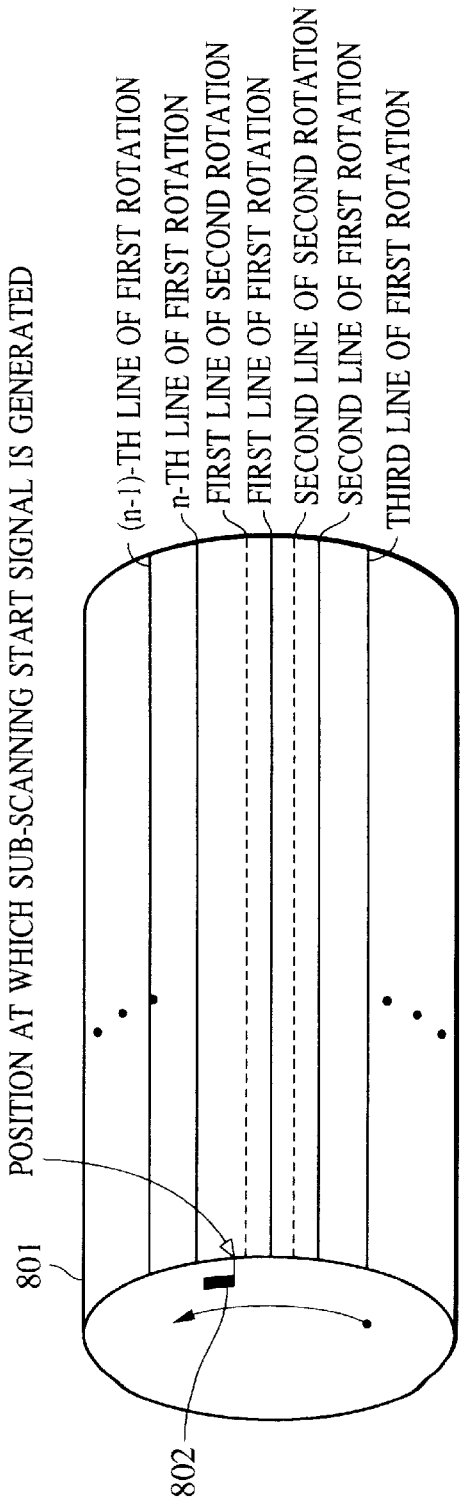
FIGS. 18A and 18B illustrate the main scanning lines formed on a photosensitive member or an intermediate transfer member of a conventional image forming apparatus.
Figure 18B:
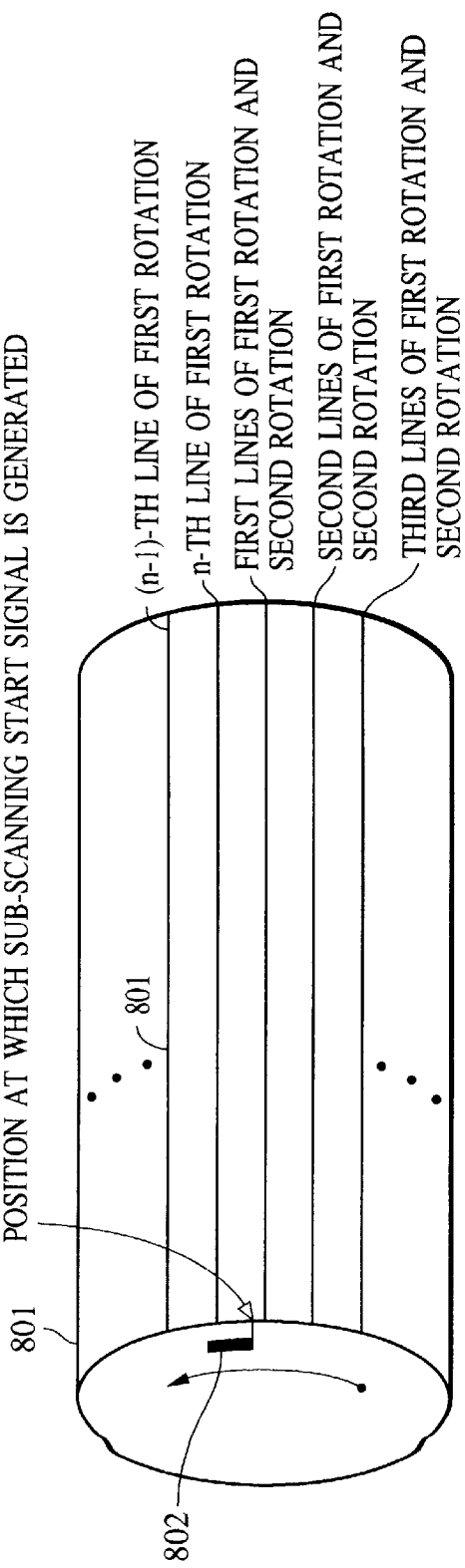
Figure 19:
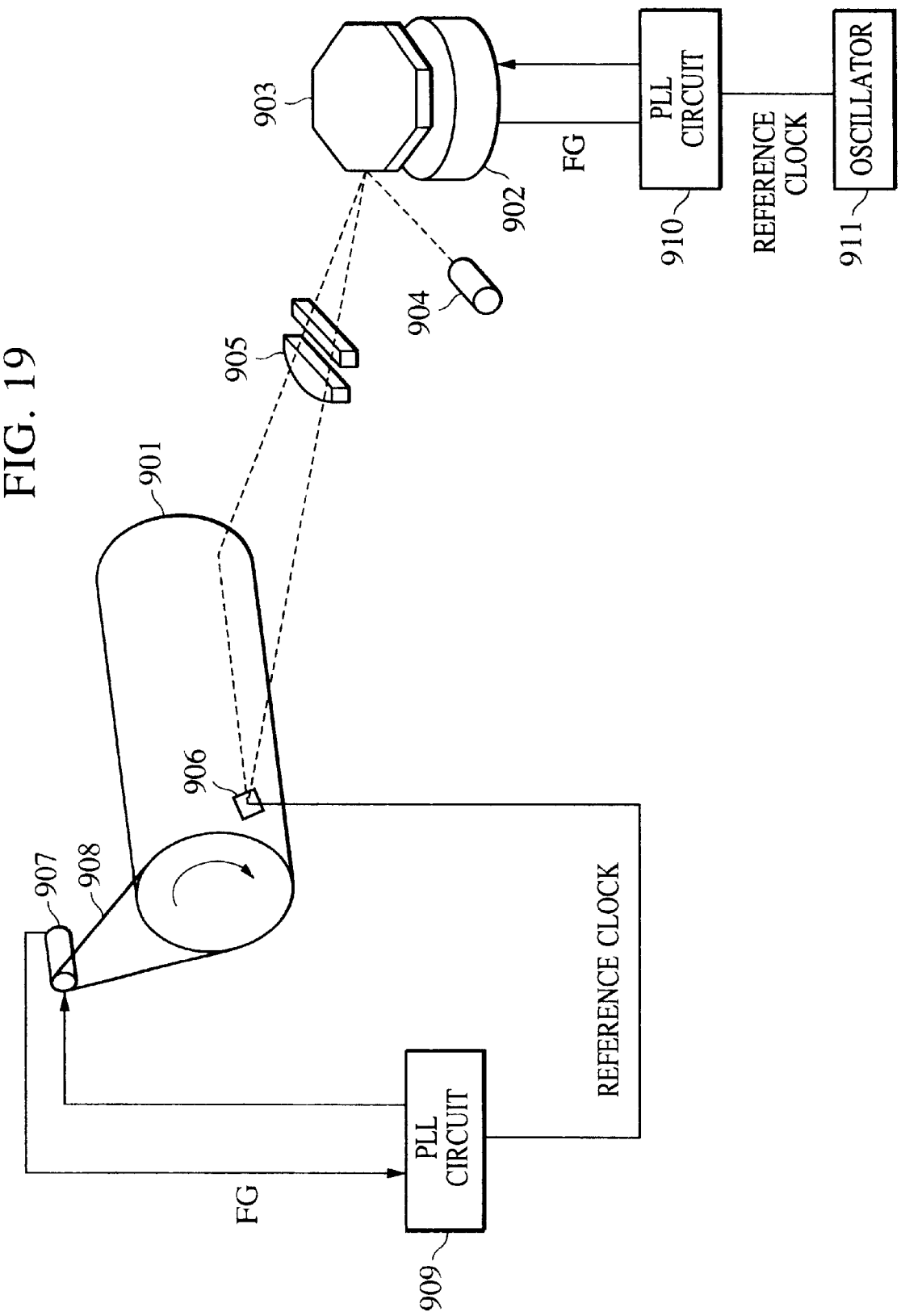
FIG. 19 is a schematic diagram illustrating a conventional image forming apparatus.
Figure 20:
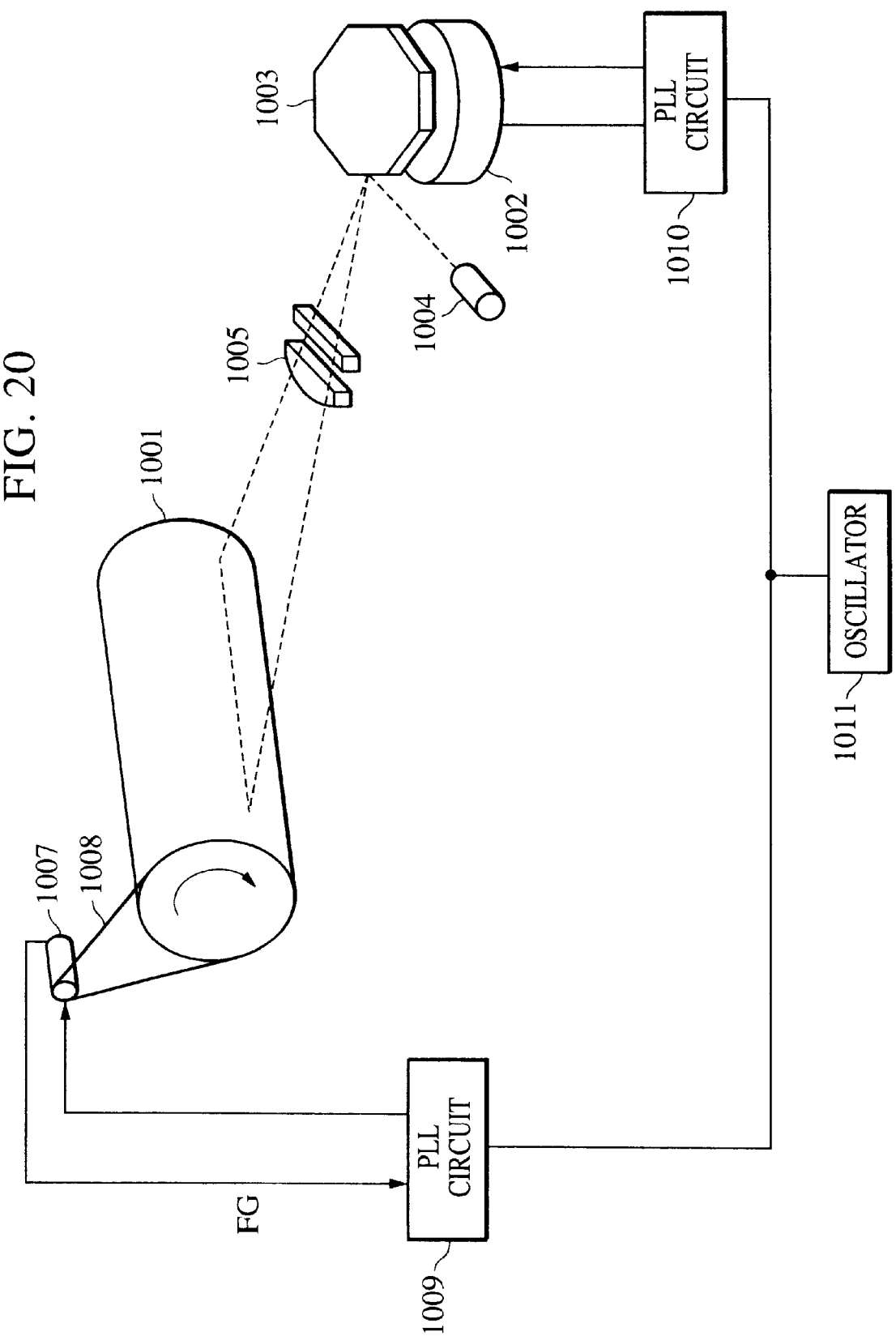
Figure 21:
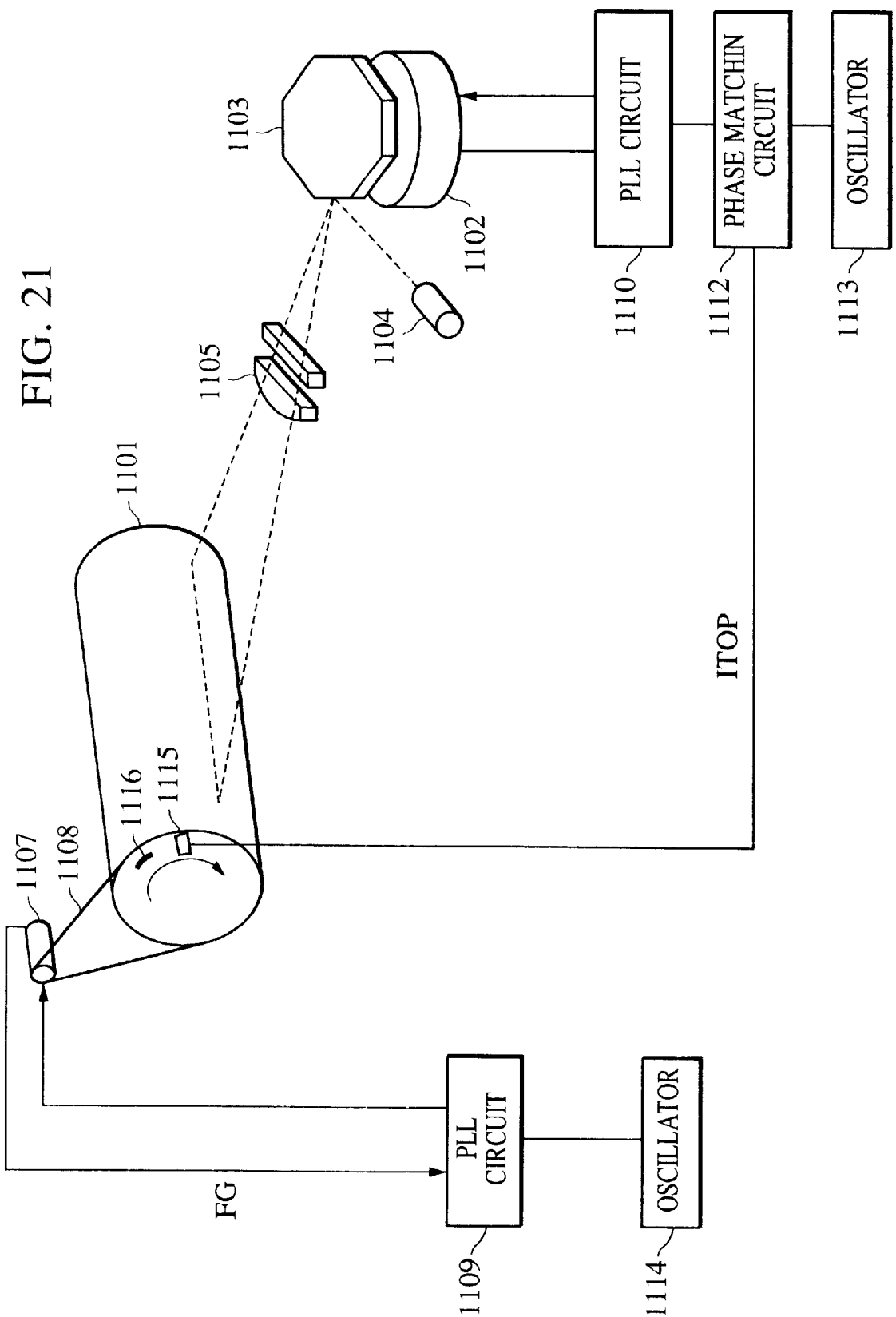
FIG. 21 is a schematic diagram illustrating a conventional image forming apparatus.
Figure 22:
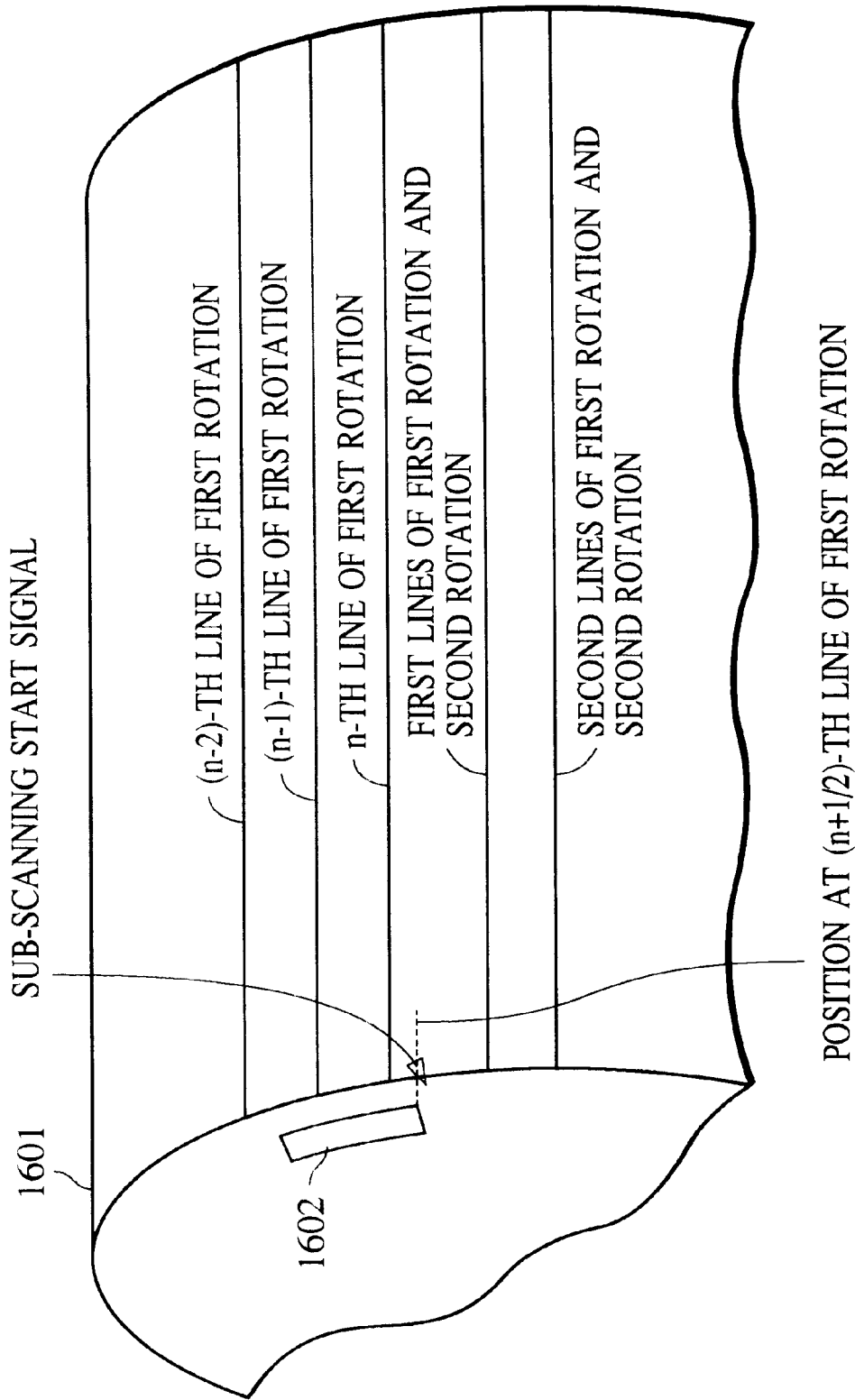
FIG. 22 illustrates the relationship between main scanning lines and an ITOP signal in a conventional image forming apparatus.
Figure 23A:
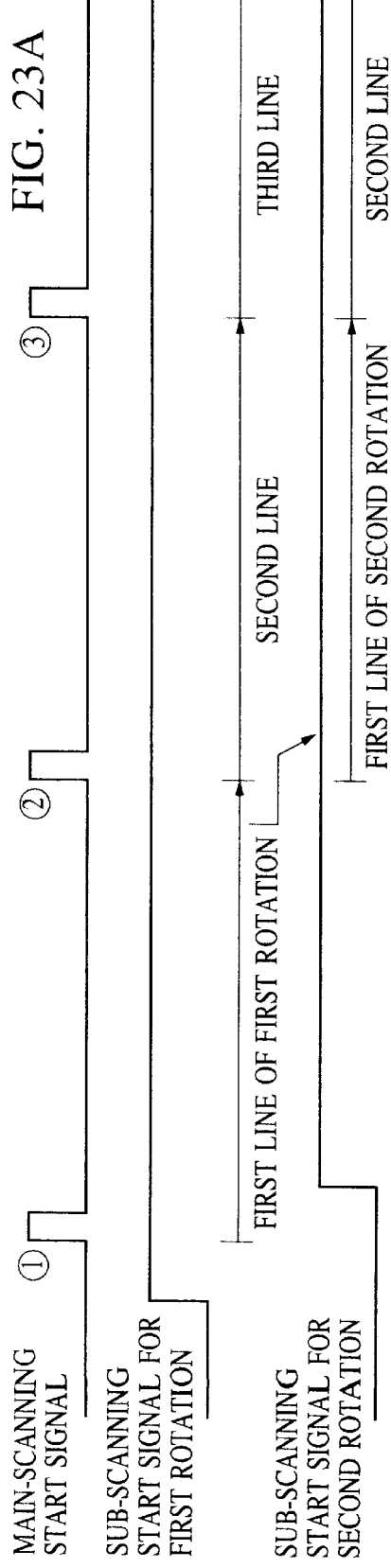
FIGS. 23A and 23B illustrate the image forming timing in a conventional image forming apparatus.
Figure 23B:
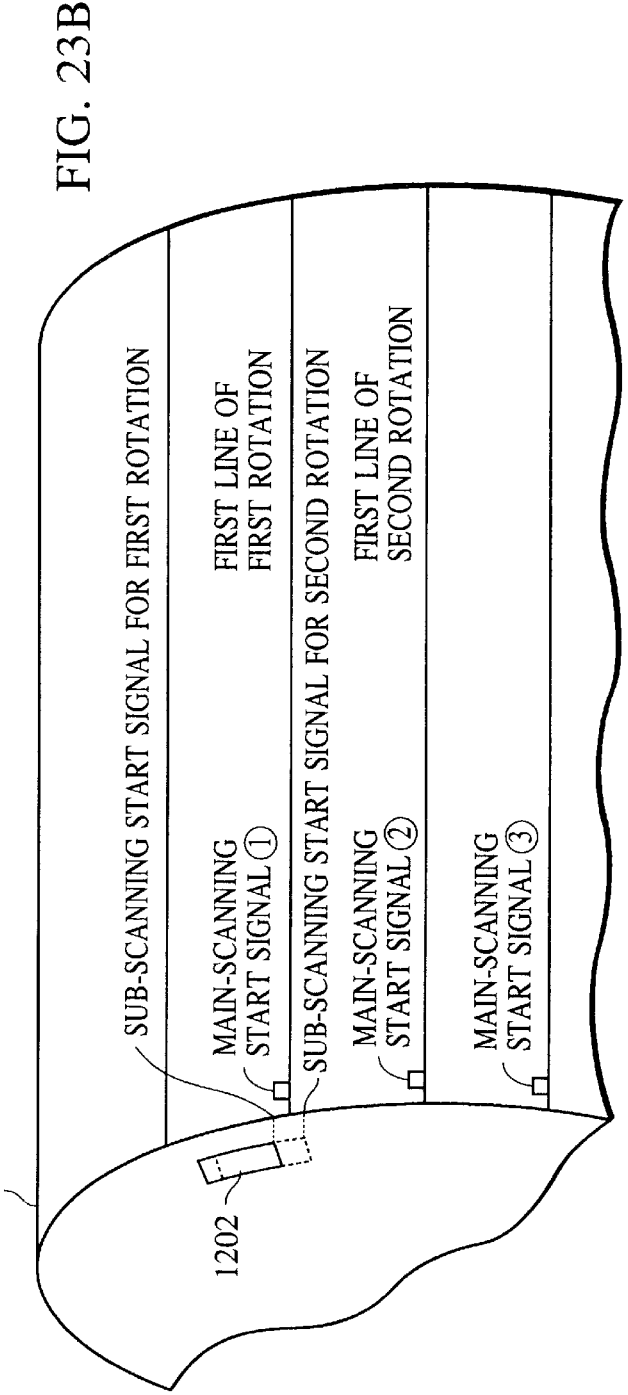
Figure 24:
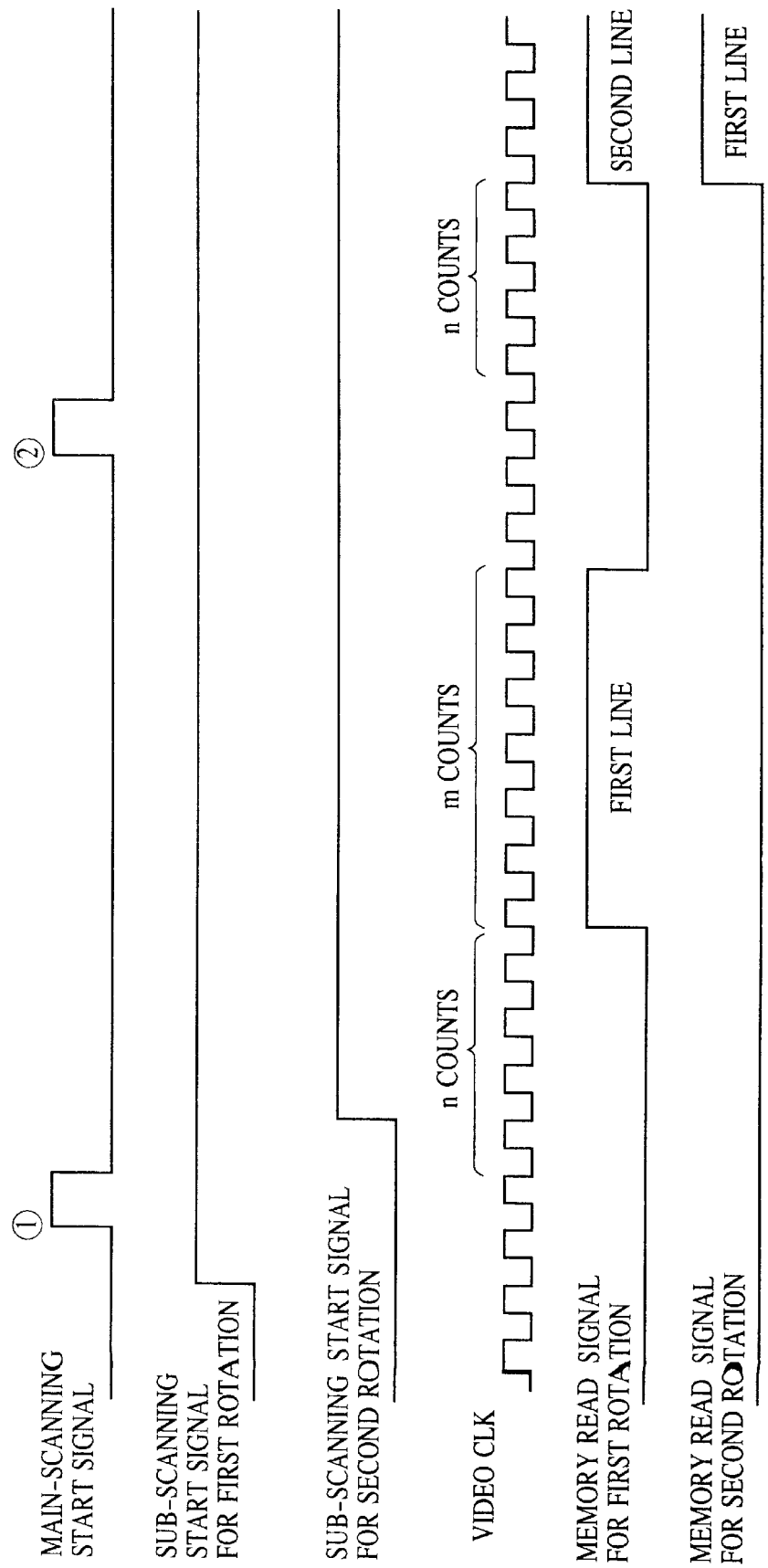
FIG. 24 illustrates the image forming timing in a conventional image forming apparatus.

FIG. 17 is a timing chart illustrating the phase matching operation performed by the image forming apparatus according to the fifth embodiment of the present invention. In FIG. 17, the ITOP signal is positioned away from the adjacent BD signals by "¼" lines or more. The same signals as those shown in FIG. 15 are represented by like numbers.

Referring to FIG. 17, the ITOP signal ① for the first color is generated from BD1 by A1 (A1<(¼)T). Accordingly, in order to position the ITOP signal away from the BD signal by "¼T", the ITOP signal is required to be delayed by "(⅓)T−A1", as indicated by the corrected ITOP signal ① for the first color.

The ITOP signal ② for the first color is generated away from BD1 by A2 (A2>(¾)T). Thus, in order to position the ITOP signal away from the BD signal by "¼T", it is necessary to delay the ITOP signal by "T+(⅓)T−A2", as represented by the corrected ITOP signal ② for the first ax-color.

Further, the ITOP signal ③ is generated at a position from BD1 by A3 ((¼)T<A3<(¾)T). Accordingly, the input of the ITOP signal is positioned from the adjacent BD signals by "(¼)T" or more. Thus, the ITOP signal output from the 3-CLK delay circuit 506 can be used without further delaying the ITOP signal.

The above-described phase matching operation is discussed in detail below with reference to FIGS. 16 and 17.

The latch circuit 503 latches the output of the UP counter 502 upon detecting by the rising-edge detection circuit 501 the rising edge of the ITOP signal for the first rotation, which is generated from the ITOP sensor 110 disposed within the transfer drum 108. The latched count data is then input into the comparator 2215, the comparator 2208, and the first subtracting circuit 1709, and the second subtracting circuit 1710. The comparator 2208 compares the latched count data with the data set by the CPU 130. When the number of counts of the cycle of the BD signal is represented by T, the set data is "(¾)T", which is "¾" times T.

At the timing of the input of the ITOP signal ① for the first color shown in FIG. 17, the output of the latch circuit 503 is smaller than "(¼)T", and thus, both outputs of the comparator 2208 and the comparator 2215 become "L". Accordingly, the output of the first subtracting circuit 1709, i.e., "(⅓)T−A1", is selected by the selector 1711. The output of the first subtracting circuit 1709 is used as a period by which the ITOP signal is delayed, i.e., the duration from the input of the ITOP signal to the position away from the start of the BD signal by "¼" lines or greater. With this period of delay, it is possible to input the ITOP signal at a position away from the BD signal by ¼" lines or greater.

At the timing of the ITOP signal ② for the first color shown in FIG. 17, the output of the latch circuit 503 is greater than "(¾)T", both outputs of the comparator 2208 and the comparator 2215 become at the level "H". Accordingly, the outcome of the second subtracting circuit 1710, i.e., "T+(⅓)T−A2" is selected by the selector 1711. The output of the second subtracting circuit 1710 serves as a period by which the ITOP signal is delayed, i.e., the duration from the input of the ITOP signal to the position away from BD2 by "(¼)" lines or greater. With this period of delay, the ITOP signal can be input at a position away from the BD signal by "¼" lines or greater.

As discussed above, the output data of the first subtracting circuit 1709 or the second subtracting circuit 1710 is selected by the selector 1711. The data is then input into the data load terminal of the down counter 512, and is further loaded into the down counter 512 in synchronization with the output of the rising-edge detection circuit 501 that has matched the clock by using the flip-flop 507.

Upon completing the counts of the loaded data, the down counter 512 sends the RC output to the JK flip-flop 513. The period during which the down counter 512 is counting serves as a period by which the ITOP signal is required to be delayed for phase matching. The JK flip-flop 513 is reset at the rising edge of the ITOP signal, and the Q output ITOPDLY is set to the level "L". The Q output remains at the level "L" until the RC output of the down counter 512 has been output and set.

That is, the Q output remains at the level "L" for a period necessary for delaying the ITOP signal after the rising edge of the ITOP signal. The ITOPDLY output and the delayed ITOP signal for a predetermined period (3 CLKs in this embodiment) are output to the selector 2217 via the AND gate 514. In this case, since the output of the AND gate 2216 input into the selector 2217 is at the level "L", the selector 2217 directly outputs the signal input from the AND gate 514, thereby making it possible to generate the ITOP signal at a position away from the BD signal by "(¼)T" or more.

At the timing of the ITOP signal ③ for the first color shown in FIG. 17, the output of the comparator 2208 is greater than "(¼)T" and the output of the comparator 2215 is smaller than "(¾)T", i.e., "(¼)T<A3<(¾)T". It can thus be determined that the ITOP signal is positioned away from the BD signal by "(¼)T" or more. The selector 2217 then outputs the ITOP signal which is not delayed (more precisely, the ITOP signal delayed for 3 CLKs by the 3-CLK delay circuit 506) to the image-write-timing control circuit 101.

Accordingly, the ITOP signal ③ for the first color is directly output, as shown in FIG. 17, as the corrected ITOP signal ③ for the first color.

By inputting the above-described data-load enable signal, the phase of the BD signal and the phase of the ITOP signal only corresponding to the first rotation are sampled, and the ITOP signal is delayed so that it can be generated at the middle of the BD signal. Then, for the second rotation through the n-th rotation, the data-load enable signal is set at the level "L". This makes it possible to retain the same data used for the delay operation for the first rotation. Accordingly, the ITOP signal for the first rotation is generated at a position away from the BD signal by "(¼)T", and the ITOP signals for the second and subsequent rotations are generated while being offset from the position of the ITOP signal for the first rotation in accordance with the mechanical precision of the image forming apparatus, such as the operational precision of the photosensitive-drum motor 115.

In this embodiment, the distance of the ITOP signal that should be away from the BD signal is set to be "¼" lines or greater. However, the ITOP signal may be away from the BD signal by a range from "¼" to "½" lines. If the amount of offset caused by the difference between the ITOP signal and the BD signal is less than "¼" lines, for example, "1/n", the ITOP signal may be positioned away from the BD signal by a range from "1/n" to "½". In such modifications, advantages similar to those offered by this embodiment may be obtained.

Additionally, in this embodiment, the ITOP signal is adjusted to be positioned from the BD signal relative to the BD signal immediately before the input of the ITOP signal. However, the BD signal immediately after the generation of the ITOP signal may be used as a reference.

[Sixth Embodiment]

In the first through the fifth embodiments, the main-scanning start signal (BD signal) is scaled and then used as a reference clock for the photosensitive-drum motor 115 for driving the photosensitive drum 105, the transfer drum 108, and the intermediate transfer medium. Based on the above reference clock, the number of main-scanning start signals (BD signals) obtained while the photosensitive drum 105 or the transfer drum 108 is rotated one turn and the number of main-scanning recording line signals that are synchronized with the BD signals are set to be integers. Alternatively, the same clock may be used as the reference clock for the photosensitive-drum motor 115 and the reference clock for the scanner motor 106 for driving the main scanning operation. Based on the shared clock, the photosensitive drum 105, the transfer drum 108, and the intermediate transfer medium may be synchronized with the scanner motor 106.

In the sixth embodiment, advantages similar to those offered by the first through the fifth embodiments may be obtained.

[Seventh Embodiment]

Instead of using the scaled BD signal as a reference clock as in the first through the fifth embodiments, phase matching may be performed between main-scanning start signal (BD signal) and the sub-scanning start signal every time the sub-scanning start signal (ITOP signal) is generated. With this arrangement, the photosensitive-drum motor 115 for driving the photosensitive drum 105, the transfer drum 108, and the intermediate medium may be synchronized with the scanner motor 106 for driving the main scanning operation.

In the seventh embodiment, advantages similar to those offered by the first through the sixth embodiments may be obtained.

[Eighth Embodiment]

In the first through the seventh embodiments, one ITOP signal is generated in response to each rotation of the photosensitive drum 105. If, however, a plurality of ITOP signals are generated in response to each rotation of the photosensitive drum 105, calculation may be performed on the period by which each ITOP signal is delayed. Based on the calculated period, each ITOP signal may be delayed.

With this arrangement, even when a plurality of latent images are formed or transferred in accordance with each rotation of the photosensitive drum, the positions at which the recording of the images for the first to the n-th colors is started can be precisely matched, thereby obtaining high quality images free of color shifting.

In the first embodiment, the sub-scanning start signal (ITOP signal) is generated upon detecting the sensor flag 111 fixed within the transfer drum 108 by the ITOP sensor 110. Alternatively, a counting portion for counting the cycle of the photosensitive drum 105 or the transfer drum 108 may be provided, and based on counts of the counting portion, the sub-scanning start signal (ITOP signal) may be transmitted.

With the above configuration, the position at which the ITOP signal for the first color is generated in the cycle of the BD signal is first detected. Then, the positions at which the ITOP signals for the subsequent colors are generated in the cycle of the BD signal are detected. Subsequently, the phase difference between the ITOP signal and the ITOP signal for the first color is determined. Based on the phase difference, the counts of the sub-scanning line counter are controlled. Consequently, the positions at which the recording of the images for the respective colors is started are matched. As a result, high quality images free of color shifting can be attained.

Even if the sub-scanning start signal is generated at any timing, the delay function reliably adjusts the sub-scanning start signal to the middle of the cycle of the main-scanning start signal, thereby accommodating positional offsets of the sub-scanning start signals and adjusting the timing of the generation of the main-scanning start signal. Thus, the positions at which the recording of the images for the respective colors can be matched to the position at which the recording of the image for the first color is started. It is therefore possible to obtain high quality images free of color shifting.

Additionally, although in the foregoing embodiments the control indicated by the flow chart of FIG. 8 is performed by hardware, it may be implemented by using software. In this case, a storage medium for storing a software program code implementing the functions of the aforementioned embodiments may be supplied to a system or an apparatus. Then, the system or the apparatus, such as a computer (or a CPU or an MPU) may read and run the program code stored in the storage medium. With this modification, the object of the present invention can also be achieved.

In this case, the program code itself read from the storage medium implements the novel functions of the present invention. Accordingly, the storage medium for storing the program code constitutes the present invention.

As the storage medium for storing the program code, a floppy disk, a hard disk, an optical disc, a magneto-optical disk, a compact disc-read only memory (CD-ROM), a compact disc-recordable (CD-R), a magnetic tape, a non-volatile memory card, a ROM, an electrically erasable read only memory (EEPROM) may be used.

The functions of the foregoing embodiments can be implemented not only by running the program code read by the computer, but also by partially or wholly executing the processing by, for example, an operating system (OS) running on the computer based on the instructions of the program code. The present invention encompasses such a modification.

The present invention also encompasses the following modification. The program code read from the storage medium may be written into a memory provided for a feature expansion board inserted into a computer or a feature expansion unit connected to the computer, and then, a CPU provided for the feature expansion board or the feature expansion unit partially or wholly executes the processing based on the instructions of the program code, thereby implementing the functions of the foregoing embodiments.

The present invention may be applied to a system formed of a plurality of apparatuses or to a single apparatus. The invention may also be accomplished by supplying the program to the system or the apparatus. In this case, the storage medium in which the software program for achieving the present invention is stored may be read into the system or the apparatus. This enables the system or the apparatus to enjoy the advantages of the invention.

Further, the software program for attaining the present invention may be downloaded and read from a database on a network via a communication program, thereby enabling the system or the apparatus to enjoy the advantages of the present invention.

As is seen from the foregoing description, the present invention offers the following advantages.

In an image forming apparatus for forming a multi-colored image by sequentially superimposing a plurality of plane images for the respective colors, which are formed based on the image information of the respective colors, the detecting function detects the phase difference between the sub-scanning start signal, which is generated in synchronization with the rotation of a photosensitive drum (image carrier), and the main-scanning start signal, which is generated by detecting a scanning optical beam reflected by a rotating polygonal mirror. Based on the detected phase difference, the control function controls the delay of the sub-scanning start signal. With this arrangement, it is possible to solve the problem suffered by the related art in which the timing of the input of the sub-scanning start signal in relation to the main-scanning start signal deviates from the ideal timing even when employing techniques for preventing positional offsets of the individual plane images by improving the configuration of the apparatus. For example, even when there is a change in the rotational speed of a photo-sensitive member due to load variation or a backlash of a driving transfer gear, it is possible to match the positions at which the recording of the individual plane images is started.

The above-described control function delays the sub-scanning start signal generated at a predetermined timing so that the sub-scanning start signal can be positioned at the middle of the cycle of the main-scanning start signal. Thus, the generation of the sub-scanning start signals can also be adjusted to the vicinity of the middle of the sub-scanning start signal, thereby sufficiently accommodating the offsets of the sub-scanning start signals.

Alternatively, the control function delays the sub-scanning start signal generated at a predetermined timing so that the sub-scanning start signal can be positioned in a predetermined range of the cycle of the main-scanning start signal. Accordingly, the sub-scanning start signals can be generated within the above predetermined range of the cycle of the main-scanning start signal. The offsets of the sub-scanning start signals can thus be sufficiently accommodated.

The middle of the above-described predetermined range of the cycle of the main-scanning start signal matches the middle of the cycle of the main-scanning start signal in accordance with the phase difference between the main-scanning start signal and the sub-scanning start signal. Thus, the sub-scanning start signals can be adjusted within the predetermined range of the cycle of the main-scanning start signal in accordance with the mechanical precision of the apparatus, such as the rotational precision of the drum motor.

Alternatively, when the phase difference between the main-scanning start signal and the sub-scanning start signal detected by the detecting function is less than "½" the cycle of the main-scanning start signal, the control function delays the sub-scanning start signal so that the signal can be generated at the middle of the current cycle of the main-scanning start signal. On the other hand, if the above phase difference is greater than "½" the cycle of the main-scanning start signal, the control function delays the sub-scanning start signal so that the signal can be generated at the middle of the subsequent cycle of the main-scanning start signal. This makes it possible to adjust the position of the sub-scanning start signal to the middle of the cycle of the main-scanning start signal while effectively utilizing the main-scanning start signal. As a consequence, positional offsets of images caused by, for example, variation in the rotational speed of the drum motor, can be sufficiently accommodated by improving the mechanical precision of the apparatus, such as the precision of a motor and a driving mechanism.

The aforementioned predetermined timing is a timing at which the sub-scanning start signal for the first color (first rotation) is generated. The periods by which the sub-scanning start signals for the subsequent colors are delayed are calculated. Based on the calculated period, each sub-scanning start signal is delayed so that it can be generated in the vicinity of the middle of the cycle of the main-scanning start signal. Thus, positional offsets of the sub-scanning start signals can be sufficiently accommodated.

Alternatively, the aforementioned predetermined timing is a timing at which all the sub-scanning start signals are generated. The period by which each sub-scanning start signal is delayed is calculated every time the signal is generated. Based on the calculated period, the sub-scanning start signal is delayed so that it can be generated near the middle of the cycle of the sub-scanning start signal. As a result, positional offsets of the sub-scanning start signals can be sufficiently accommodated.

Additionally, the image information for the respective colors is read from a document, thereby making it possible to match the positions at which the recording of the images for the respective colors is started. Alternatively, the image information for the respective colors is input from an information processing apparatus via a predetermined communication medium. Thus, the positions at which the recording of the images for the respective colors is started can be matched.

According to the method for controlling the aforementioned image forming apparatus, advantages similar to those obtained by the image forming apparatus can also be offered.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus for forming a multi-colored image by superimposing a plurality of plane images, said apparatus comprising:

image-data generating means for generating image data corresponding to each of said plurality of plane images;

optical-beam generating means for generating an optical beam based on image data generated by said image-data generating means;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier; and second generation means for generating a main-scanning start signal to indicate a rotational timing of said rotating polygonal mirror;

wherein said image-carrier driving means rotates said image carrier by using the main-scanning start signal generated by said second generation means as a reference clock, and said image-data generating means controls a timing at which the image data corresponding to each of said plurality of plane images is generated in accordance with a phase difference between the main-scanning start signal firstly generated after the sub-scanning start signal is generated and the sub-scanning start signal.

2. An image forming apparatus according to claim 1, wherein said plurality of plane images comprise yellow, magenta, and cyan plane images.

3. An image forming apparatus according to claim 1, further comprising a scanner for generating image data corresponding to said plurality of plane images by reading an original document.

4. A method for controlling an image forming apparatus for forming a multi-colored image by superimposing a plurality of plane images, said method comprising the steps of:

generating image data corresponding to each of said plurality of plane images;

generating an optical beam based on the image data;

rotating an image carrier;

scanning said image carrier with said optical beam while said image carrier is rotated, said optical beam being reflected by a rotating polygonal mirror during rotation;

generating a sub-scanning start signal to indicate a rotational timing of said image carrier; and generating a main-scanning start signal to indicate a rotational timing of said rotating polygonal mirror;

wherein said image carrier is rotated using the main-scanning start signal as a reference clock, and a timing at which the image data corresponding to each of said plurality of plane images is generated is controlled in accordance with a phase difference between the main-scanning start signal firstly generated after the sub-scanning start signal is generated and the sub-scanning start signal.

5. An image forming apparatus for forming a multi-colored image by superimposing a plurality of plane images, said apparatus comprising:

image-data generating means for generating image data corresponding to each of said plurality of plane images;

optical-beam generating means for generating an optical beam based on image data generated by said image-data generating means;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier; and second generation means for generating a main-scanning start signal to indicate a rotational timing of said rotating polygonal mirror;

wherein said image carrier and said rotating polygonal mirror are rotated based on a common reference clock, and said image-data generating means controls a timing at which the image data corresponding to each of said plurality of plane images is generated in accordance with a phase difference between the main-scanning start signal firstly generated after the sub-scanning start signal is generated and the sub-scanning start signal.

6. An image forming apparatus according to claim 5, wherein said plurality of plane images comprise yellow, magenta, and cyan plane images.

7. An image forming apparatus according to claim 5, further comprising a scanner for generating image data corresponding to said plurality of plane images by reading an original document.

8. A method for controlling an image forming apparatus for forming a multi-colored image by superimposing a plurality of plane images, said method comprising the steps of:

generating image data corresponding to each of said plurality of plane images;

generating an optical beam based on the image data;

rotating an image carrier;

scanning said image carrier with said optical beam while said image carrier is rotated, said optical beam being reflected by a rotating polygonal mirror during rotation;

generating a sub-scanning start signal to indicate a rotational timing of said image carrier; and generating a main-scanning start signal to indicate a rotational timing of said rotating polygonal mirror;

wherein said image carrier and said rotating polygonal mirror are rotated based on a common reference clock, and a timing at which the image data corresponding to each of said plurality of plane images is generated is controlled in accordance with a phase difference between the main-scanning start signal firstly generated after the sub-scanning start signal is generated and the sub-scanning start signal.

9. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images;

second generation means for generating a main-scanning start signal to indicate a rotational timing of said rotating polygonal mirror; and control means for delaying the sub-scanning start signal so that a phase difference between the main-scanning start signal and the sub-scanning start signal stays between a first predetermined value and a second predetermined value, the first and second predetermined values being greater than zero;

wherein said image-carrier driving means rotates said image carrier by using the main-scanning start signal generated by said second generation means as a reference clock.

10. An image forming apparatus according to claim 9, wherein said control means delays the sub-scanning start signals corresponding to all of said plurality of plane images.

11. An image forming apparatus according to claim 9, wherein said plurality of plane images comprise yellow, magenta, and cyan plane images.

12. An image forming apparatus according to claim 9, further comprising a scanner for generating image data corresponding to said plurality of plane images by reading an original document.

13. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images;

second generation means for generating a main-scanning start signal to indicate a rotational timing of said rotating polygonal mirror; and control means for delaying the sub-scanning start signal in accordance with a phase difference between the main-scanning start signal and the sub-scanning start signal, wherein the sub-scanning start signal is delayed so that the sub-scanning start signal is generated at a middle of a cycle of the main-scanning start signal;

wherein said image-carrier driving means rotates said image carrier by using the main-scanning start signal generated by said second generation means as a reference clock.

14. A method for controlling an image forming apparatus for forming a multi-colored image by superimposing a plurality of plane images, said method comprising the steps of:

generating an optical beam based on image data corresponding to each of said plurality of plane images;

rotating an image carrier;

scanning said image carrier with said optical beam while said image carrier is rotated, said optical beam being reflected by a rotating polygonal mirror during rotation;

generating a sub-scanning start signal to indicate a rotational timing of said image carrier corresponding to each of said plurality of plane images;

generating a main-scanning start signal to indicate a rotational timing of said rotating polygonal mirror; and delaying the sub-scanning start signal so that a phase difference between the main-scanning start signal and the sub-scanning start signal stays between a first predetermined value and a second predetermined value, the first and second predetermined values being greater than zero;

wherein said image carrier is rotated by using the main-scanning start signal as a reference clock.

15. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images;

second generation means for generating a main-scanning start signal to indicate a rotational timing of said rotating polygonal mirror; and control means for delaying the sub-scanning start signal so that a phase difference between the main-scanning start signal and the sub-scanning start signal stays between a first predetermined value and a second predetermined value, the first and second predetermined values being greater than zero;

wherein said image carrier and said rotating polygonal mirror are rotated based on a common reference clock.

16. An image forming apparatus according to claim 15, wherein said control means delays the sub-scanning start signal corresponding to all of said plurality of plane images.

17. An image forming apparatus according to claim 15, wherein said plurality of plane images comprise yellow, magenta, and cyan plane images.

18. An image forming apparatus according to claim 15, further comprising a scanner for generating image data.

19. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images:

second generation means for generating a main-scanning start signal to indicate a rotational timing of said rotating polygonal mirror; and control means for delaying the sub-scanning start signal in accordance with a phase difference between the main-scanning start signal and the sub-scanning start signal, wherein the sub-scanning start signal is delayed so that the sub-scanning start signal is generated at a middle of a cycle of the main-scanning start signal;

wherein said image carrier and said rotating polygonal mirror are rotated based on a common reference clock.

20. A method for controlling an image forming apparatus for forming a multi-colored image by superimposing a plurality of plane images, said method comprising the steps of:

generating an optical beam based on image data corresponding to each of said plurality of plane images;

rotating an image carrier;

scanning said image carrier with said optical beam while said image carrier is rotated, said optical beam being reflected by a rotating polygonal mirror during rotation;

generating a sub-scanning start signal to indicate a rotational timing of said image carrier corresponding to each of said plurality of plane images;

generating a main-scanning start signal to indicate a rotational timing of said rotating polygonal mirror; and delaying the sub-scanning start signal so that a phase difference between the main-scanning start signal and the sub-scanning start signal stays between a first predetermined value and a second predetermined value, the first and second predetermined values being greater than zero;

wherein said image carrier and said rotating polygonal mirror are rotated based on a common reference clock.

21. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images;

second generation means for generating a main-scanning start signal to indicate a rotational timing of said rotating polygonal mirror; and control means for delaying the sub-scanning start signal in accordance with a phase difference between the main-scanning start signal and the sub-scanning start signal;

wherein said control means delays the sub-scanning start signal so that the sub-scanning start signal is generated within a predetermined range from a middle of a cycle of the main-scanning start signal.

22. An image forming apparatus for forming a multi-colored image by superimposing a plurality of plane images, said apparatus comprising:

optical-beam generating means for generating an optical beam based on image data corresponding to each of said plurality of plane images;

image-carrier driving means for rotating an image carrier;

a rotating polygonal mirror for scanning said image carrier during rotation by reflecting the optical beam on said rotating polygonal mirror during rotation;

first generation means for generating a sub-scanning start signal to indicate a rotational timing of said image carrier corresponding to each of said plane images;

second generation means for generating a main-scanning start signal to indicate a rotational timing of said rotating polygonal mirror; and control means for delaying the sub-scanning start signal in accordance with a phase difference between the main-scanning start signal and the sub-scanning start signal;

wherein said control means does not delay said sub-scanning start signal when said phase difference stays in a predetermined range, and wherein said control means delays said sub-scanning start signal when said phase difference is out of said predetermined range.

23. An image forming apparatus according to claim 22, wherein said control means delays said sub-scanning start signal to bring the phase difference within said predetermined range when said phase difference is detected to be out of said predetermined range.

* * * * *

UNITED STATES PATENT AND TRADEMARK OFFICE
CERTIFICATE OF CORRECTION

PATENT NO.    : 6,236,415 B1
DATED         : May 22, 2001
INVENTOR(S)   : Nozaki et al.

Page 1 of 1

It is certified that error appears in the above-identified patent and that said Letters Patent is hereby corrected as shown below:

<u>Drawings,</u>
Sheet 21, "MATCHIN" should read -- MATCHING --.

<u>Column 2,</u>
Lne 19, "n+½." should read -- n+½ --.

<u>Column 6,</u>
Line 22, "②," should read -- ③, --.

<u>Column 26,</u>
Line 3, " "(2/5)T-A)'," should read -- "(2/5)T-A", --.

<u>Column 28,</u>
Line 58, "m(1/3)T"." should read -- "(1/3)T". --.

<u>Column 29,</u>
Line 8, " " (2/5)". " should read -- "(2/5)T". --.

<u>Column 38,</u>
Line 38, "data." should read -- data corresponding to said plurality of plane images by reading an original document. --.

Signed and Sealed this

Fourteenth Day of May, 2002

Attest:

*Attesting Officer*

JAMES E. ROGAN
*Director of the United States Patent and Trademark Office*